(12) United States Patent
Chu et al.

(10) Patent No.: US 9,363,582 B2
(45) Date of Patent: Jun. 7, 2016

(54) OPTICAL BEAM ROUTING APPARATUS AND METHODS

(75) Inventors: Daping Chu, Cambridge (GB); Neil Collings, Cambridge (GB); William Crossland, Harlow (GB); Maura Michelle Redmond, Cambridge (GB); Brian Robertson, Cambridge (GB)

(73) Assignee: Cambridge Enterprise Limited, Cambridge (GB)

( * ) Notice: Subject to any disclaimer, the term of this patent is extended or adjusted under 35 U.S.C. 154(b) by 17 days.

(21) Appl. No.: 14/005,257

(22) PCT Filed: Mar. 7, 2012

(86) PCT No.: PCT/GB2012/050501
§ 371 (c)(1),
(2), (4) Date: Aug. 19, 2014

(87) PCT Pub. No.: WO2012/123715
PCT Pub. Date: Sep. 20, 2012

(65) Prior Publication Data
US 2014/0355985 A1 Dec. 4, 2014

(30) Foreign Application Priority Data

Mar. 14, 2011 (GB) ................................... 1104235.5

(51) Int. Cl.
*H04Q 11/00* (2006.01)
*G02F 1/29* (2006.01)
(Continued)

(52) U.S. Cl.
CPC ............ *H04Q 11/0005* (2013.01); *G02F 1/292* (2013.01); *G03H 1/0005* (2013.01);
(Continued)

(58) Field of Classification Search
CPC .................. H04Q 11/0005; H04Q 2011/0016; H04J 14/0212; H04L 45/62; G03H 1/0005; G03H 1/2294; G03H 2225/32; G02F 1/292; G02F 2203/12; G02F 2203/18
USPC ......................................................... 398/147
See application file for complete search history.

(56) References Cited

U.S. PATENT DOCUMENTS

| 5,416,616 A | 5/1995 | Jenkins et al. |
| 5,617,227 A | 4/1997 | De Bougrenet De La Tocnaye et al. |

(Continued)

FOREIGN PATENT DOCUMENTS

| GB | 2350961 A | 12/2000 |
| GB | 2456170 A | 7/2009 |

(Continued)

OTHER PUBLICATIONS

O'Brien, et al., "A Holographically Routed Optical Crossbar Using a Ferroelectric Liquid-Crystal Over Silicon Spatial Light Modulator", "Ferroelectrics", 1996, pp. 79-86, vol. 181, Publisher: Overseas Publishers Association, Published in: MY.

(Continued)

*Primary Examiner* — Leslie Pascal
(74) *Attorney, Agent, or Firm* — Loginov & Associates, PLLC; William A. Loginov

(57) ABSTRACT

This invention relates to methods and apparatus for routing light beams in telecommunications devices using holographic techniques, in particular by displaying kinoforms on LCOS (Liquid Crystal on Silicon) devices. Thus we describe optical beam routing apparatus comprising: at least one optical input to receive an input beam; a plurality of optical outputs; a spatial light modulator (SLM) on an optical path between said optical input and said optical outputs; and a driver for said SLM to display a kinoform on said SLM to diffract said input beam into an output beam comprising a plurality of diffraction orders, wherein a routed one of said diffraction orders is directed to at least one selected said optical output; wherein said apparatus is configured to modify a wavefront of said output beam to reduce a coupling of said output beam into said selected optical output; and wherein said kinoform is adapted to compensate for said wavefront modification to compensate for said reduced coupling and thereby to reduce a coupling of other diffracted light from said input beam into others of said optical outputs than said at least one selected optical output.

14 Claims, 18 Drawing Sheets

(51) Int. Cl.
G03H 1/00 (2006.01)
G03H 1/22 (2006.01)
H04J 14/02 (2006.01)
H04L 12/721 (2013.01)

(52) U.S. Cl.
CPC .......... *G03H1/2294* (2013.01); *H04J 14/0212* (2013.01); *H04L 45/62* (2013.01); *G02F 2203/12* (2013.01); *G02F 2203/18* (2013.01); *G03H 2225/32* (2013.01); *H04Q 2011/0016* (2013.01)

(56) References Cited

U.S. PATENT DOCUMENTS

| 7,174,065 B2 | 2/2007 | Lacey et al. | |
| 7,457,547 B2 | 11/2008 | Frisken et al. | |
| 2001/0050787 A1* | 12/2001 | Crossland | G02F 1/292 359/15 |
| 2006/0067611 A1 | 3/2006 | Frisken et al. | |

FOREIGN PATENT DOCUMENTS

| WO | 03021341 A2 | 3/2003 |
| WO | 2005047942 A1 | 5/2005 |
| WO | 2006047834 A1 | 5/2006 |
| WO | 2006110241 A1 | 10/2006 |
| WO | 2007131649 A1 | 11/2007 |

OTHER PUBLICATIONS

Bernardo, "ABCD Matrix Formalism of Fractional Fourier Optics", "Opt. Eng.", Mar. 1996, pp. 732-740, vol. 35, No. 3, Publisher: Society of Photo-Optical Instrumentation Engineers, Published in: US.

Gil-Leyva, et al., "Aberration Correction in an Adaptive Free-Space Optical Interconnect With an Error Diffusion Algorithm", "Applied Optics", Jun. 1, 2006, pp. 3782-3792, vol. 45, No. 16, Publisher: Optical Society of America, Published in: US.

Zhang, et al., "Beam Shaping in the Fractional Fourier Transform Domain", "J. Opt. Soc. Am. A", 1998, pp. 1114-1120, vol. 15, No. 5, Publisher: Optical Society of America, Published in: US.

Testorf, "Design of Diffractive Optical Elements for the Fractional Fourier Transform Domain: Phase-Space Approach", "Applied Optics", Jan. 1, 2006, pp. 76-82, vol. 45, No. 1, Publisher: Optical Society of America, Published in: US.

Ozaktas, et al., "Digital Computation of the Fractional Fourier Transform", "Transactions on Signal Processing", Sep. 1996, pp. 2141-2150, vol. 44, No. 9, Publisher: IEEE, Published in: US.

Ozaktas, et al., "Fractional Fourier Optics", "J. Opt. Soc. Am. A", Apr. 1995, pp. 743-751, vol. 12, No. 4, Publisher: Optical Society of America, Published in: US.

Ozaktas, et al., "The Fractional Fourier Transform With Applications in Optics and Signal Processing", 2001, pp. 418-419, Publisher: John Wiley & Sons, Ltd, Published in: US.

Moreno, et al., "Fractional Fourier Transform Optical System With Programmable Lenses", "Applied Optics", Nov. 10, 2003, pp. 6544-6548, vol. 42, No. 32, Publisher: Optical Society of America, Published in: US.

Bernardo, et al., "Fractional Fourier Transforms and Imaging", "J. Opt. Soc. Am. A", Oct. 1994, pp. 2622-2626, vol. 11, No. 10, Publisher: Optical Society of America, Published in: US.

Zalevsky, et al., "Gerchberg-Saxton Algorithm Applied in the Fractional Fourier or the Fresnel Domain", "Optics Letters", Jun. 15, 1996, pp. 842-844, vol. 21, No. 12, Publisher: Optical Society of America, Published in: US.

Crossland, et al., "Holographic Optical Switching: The Roses Demonstrator", "Journal of Lightwave Technology", Dec. 2000, pp. 1845-1854, vol. 18, No. 12, Publisher: IEEE, Published in: US.

Palima, et al., "Holographic Projection of Arbitrary Light Patterns With a Supressed Zero-Order Beam", "Applied Optics", Jul. 10, 2007, pp. 4197-4201, vol. 46, No. 20, Publisher: Optical Society of America, Published in: US.

Zambada, "Holographic Wave Front Optimisation on an Adaptive Optical Free-Space Interconnect, Chapter 7, Experimental Optical Interconnect", "University of Cambridge PhD Dissertation", Jun. 2005, pp. 99-121.

Lohmann, "Image Rotation, Wigner Rotation, and the Fractional Fourier Transform", "J. Opt. Soc. Am. A", Oct. 1993, pp. 2181-2186, vol. 10, No. 10, Publisher: Optical Society of America, Published in: US.

Yang, et al., "Improved Fast Fractional-Fourier-Transform Algorithm", "J. Opt. Soc. Am. A", Sep. 2004, pp. 1677-1681, vol. 21, No. 9, Publisher: Optical Society of America, Published in: US.

Collins, "Lens-System Diffraction Integral Written in Terms of Matrix Optics", "Journal of the Optical Society of America", Sep. 1970, pp. 1168-1177, vol. 60, No. 9, Publisher: The Optical Society of America, Published in: US.

Neil, et al., "New Modal Wave-Front Sensor: A Theoretical Analysis", "J. Opt. Soc. Am. A.", Jun. 2000, pp. 1098-1107, vol. 17, No. 6, Publisher: Optical Society of America, Published in: US.

Blanchard, et al., "Simultaneous Multiplane Imaging With a Distorted Grating", "Applied Optics", Nov. 10, 1999, pp. 6692-6699, vol. 38, No. 32, Published in: US.

Pei, et al., "Two Dimensional Discrete Fractional Fourier Transform", "Signal Processing", 1998, pp. 99-108, vol. 67, Publisher: Elsevier, Published in: US.

* cited by examiner

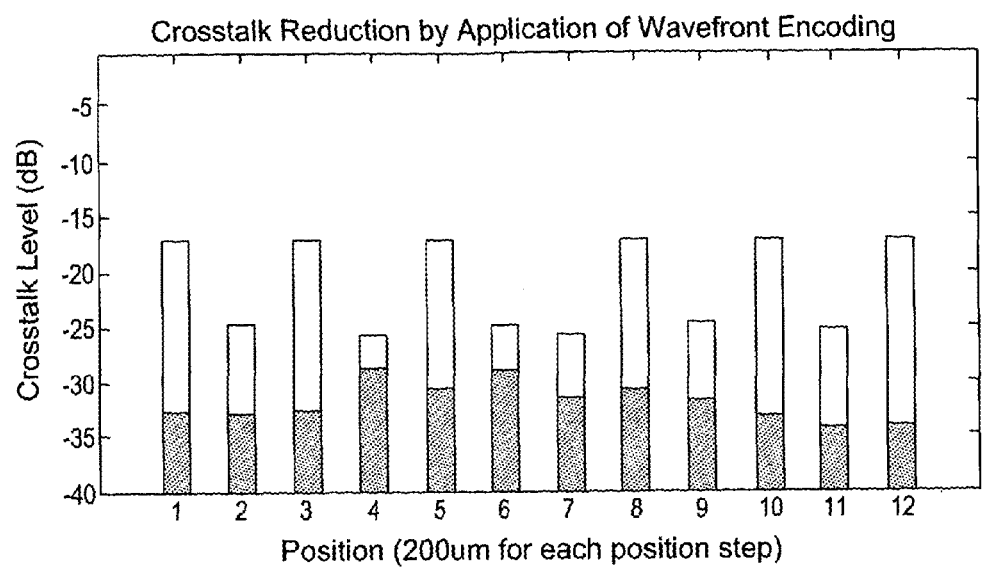
Figure 8
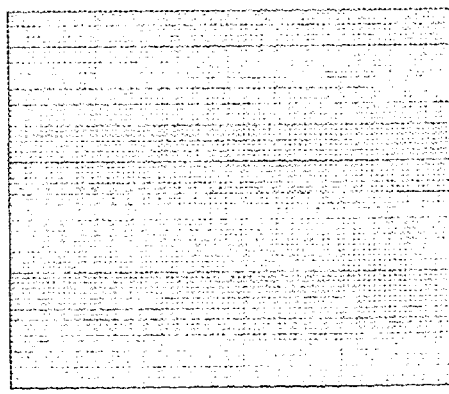
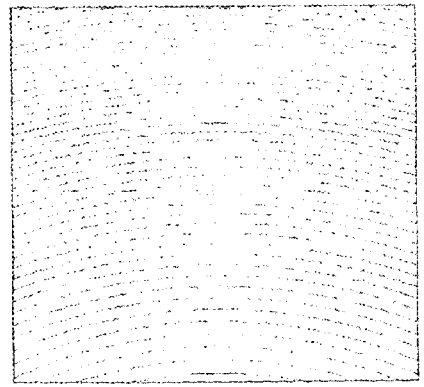
Figure 9a          Figure 9b

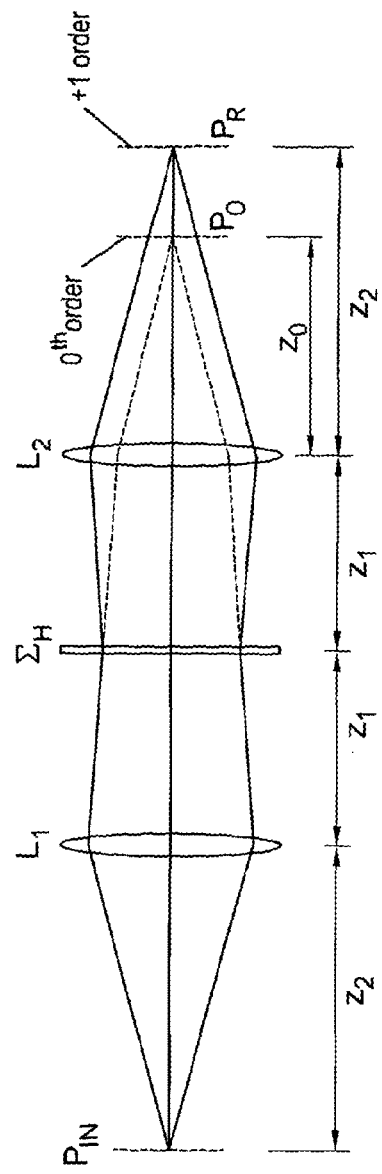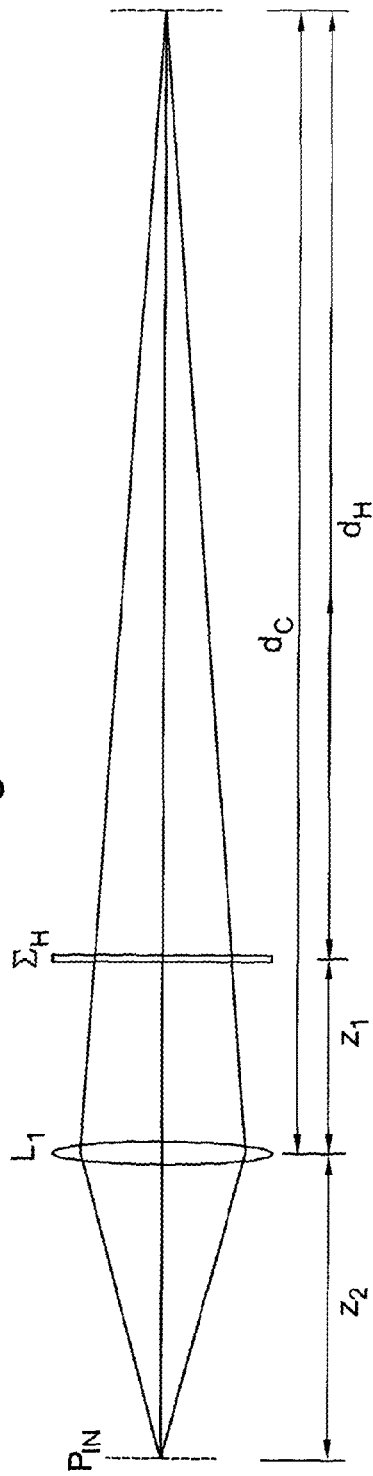
Figure 15a
Figure 15b

OPTICAL BEAM ROUTING APPARATUS AND METHODS

FIELD OF THE INVENTION

This invention relates to methods and apparatus for routing light beams in telecommunications devices using holographic techniques. Aspects of the invention relate to displaying kinoforms on LCOS (Liquid Crystal on Silicon) devices.

BACKGROUND TO THE INVENTION

Background prior art relating to the use of holographic techniques, in particular kinoforms (phase only holograms), in telecommunications can be found in: U.S. Pat. No. 5,617,227; U.S. Pat. No. 5,416,616; WO03/021341; U.S. Pat. No. 7,457,547; U.S. Pat. No. 7,174,065; GB2,350,961A; GB2,456,170A; US2006/0067611 "Wavelength Selective Reconfigurable Optical Cross-connect"; and WO2007/131649, "Method Of Forming An Image And Image Projection Device", which describes a method of forming an image comprising providing a device for imparting respective phase-shifts to different regions of an incident wavefront, wherein the phase shifts give rise to an image in a replay field, and causing zero-order light to be focused into a region between the replay field and the device. Further background can be found in "Aberration correction in an adaptive free-space optical interconnect with an error diffusion algorithm", D. Gil-Leyva, B. Robertson, T. D. Wilkinson, C. J. Henderson, in 1 Jun. 2006/Vol. 45, No. 16/APPLIED OPTICS pp. 3782; in A. A. Neil, M. J. Booth, and T. Wilson, "New modal wavefront sensor: a theoretical analysis", J. Opt. Soc. Am. A, 17, 1098 (2000); in "Holographic wave front optimisation on an adaptive optical free-space interconnect", Chapter 7, University of Cambridge PhD dissertation (http://search.lib.cam.ac.uk/?itemid=|depfacaedb|565372), June 2005, by Gil Leyva Zambada D.; and in W. A. Crossland, I. G. Manolis, M. M. Redmond, K. L. Tan, T. D. Wilkinson, M. J. Holmes, T. R. Parker, H. H. Chu, J. Croucher, V. A. Handerek, S. T. Warr, B. Robertson, I. G. Bonas, R. Franklin, C. Stace, H. J. White, R. A. Woolley, and G. Henshall, "Holographic optical switching: the ROSES demonstrator", J. Lightwave Techn. 18, 1845 (2000).

The grating patterns previously described, used to deflect an optical input beam to output fibres in a LCOS-based switch, have drawbacks arising from insertion loss and crosstalk, due to the limitations in fabricating a perfect SLM and in displaying an ideal phase pattern. This results in significant power being diffracted into unwanted diffraction orders. This is in part due to the non-ideal response of liquid crystal material, and this particular issue is addressed in our co-pending UK patent application no. 1102715.8 filed 16 Feb. 2011.

We now describe techniques which aim to mitigate crosstalk, based on a technique which we will refer to as wavefront encoding.

SUMMARY OF THE INVENTION

According to the present invention there is therefore provided optical beam routing apparatus comprising: at least one optical input to receive an input beam; a plurality of optical outputs; a spatial light modulator (SLM) on an optical path between said optical input and said optical outputs; and a driver for said SLM to display a kinoform on said SLM to diffract said input beam into an output beam comprising a plurality of diffraction orders, wherein a routed one of said diffraction orders is directed to at least one selected said optical output; wherein said apparatus is configured to modify a wavefront of said output beam to reduce a coupling of said output beam into said selected optical output; and wherein said kinoform is adapted to compensate for said wavefront modification to compensate for said reduced coupling and thereby to reduce a coupling of other diffracted light from said input beam into others of said optical outputs than said at least one selected optical output.

Broadly speaking, in embodiments of the technique we purposefully introduce an aberration, such as a defocus, into the optical system which distorts the wavefront in a predetermined manner. Then a correction is built into the kinoform displayed on the SLM, which corrects for the designed aberration. The correction process has the effect of reducing the coupling of other diffracted light from the input beam into other optical outputs than the selected output. Thus, for example, the effect of correcting for a selected diffraction order, for example, +1 (or −1) order, is to reduce the coupling of the other diffracted orders into the other optical outputs, in particular in a system in which the outputs are regularly spaced such that the unwanted orders would otherwise overlap with the non-selected outputs. The mathematics of correcting the wavefront distortion at one diffraction order has the effect of increasing the 'aberration' for the non-selected orders. Data for the kinoform may be stored in memory in the SLM driver and/or calculated as needed. In embodiments a set of kinoforms may be stored, one to direct light to each optical output (kinoforms may be combined by linear addition).

Techniques for correcting a wavefront using a kinoform are described in Gil-Leyva et al (ibid); a paper by Blanchard and Greenaway demonstrates that combining a grating with a lens results in the diffraction orders being focused at different planes—i.e. optimising focus for, say, the +1 order for a particular output claim defocuses the other orders (P M Blanchard and A H Greenaway, 'simultaneous multiplane imaging with a distorted diffraction grating' Applied Optics 38 6692 (1999)). However, as will be described later, it is not necessary for all the optical outputs to be in a common plane.

Although embodiments reduce the coupling of the unwanted diffraction orders into the unselected optical output(s), more generally, embodiments of the techniques we describe effectively locate a 'hole' in the noise field around the selected optical output(s). (This may be achieved, for example, using a "ping-pong" type algorithm, as described later). This is useful because for various reasons a real (rather than ideal) SLM displays a non-ideal phase pattern (the SLM is pixilated, the response of the liquid crystal is non-ideal, the SLM mirrors may be imperfect and result in scattered light, and so forth). Thus embodiments of the technique can be employed more generally, to mitigate noise. (We later describe a subset of multicast systems in which preliminary results indicate that cross-talk may not be reduced, but nonetheless there may be advantages in noise reduction).

The skilled person will appreciate that it is to some extent arbitrary as to whether the apparatus or the kinoform is considered as modifying the wavefront, and of the two which is considered as compensating for the modification. Thus, for example, we will describe embodiments of a system in which the apparatus is configured so that a default, non-corrected condition has the optical outputs displaced away from a focal plane of the system, the kinoform introducing lens power to a selected, target diffraction order to correct for this. However in an alternative arrangement the kinoform may, for example, introduce lens power to a selected diffraction order and the apparatus may include a lens, or more particularly a lenslet array, to compensate for this. Likewise, more generally, the kinoform may introduce a phase mask into the system (which may or may not, for example, encode lens power) and the optical system may incorporate a matched filter, for example a diffractive optical element to compensate. Thus the skilled person will appreciate that one of the apparatus and the kinoform is configured to modify the wavefront of the output beam (or beams) and the other of the apparatus or kinoform is configured to compensate for this modification.

In embodiments the apparatus is configured to modify part or all of the wavefront of the output beam by at least a phase of $\pi/2$, $\pi$ or $2\pi$ at a wavelength of operation of the apparatus. The full width at half maximum (FWHM) of the selected routed diffraction order may have a dimension or diameter of, say, $\omega_0$, in which case the non-selected diffraction orders may have a spot size of at least 2 or 3 times $\omega_0$ at a non-selected output or outputs. For a Gaussian beam a corresponding condition may apply to the mode field diameter.

As previously mentioned, in embodiments the apparatus is configured such that absent the wavelength modification compensation the routed diffraction order is defocussed on the selected optical output, the kinoform then including lens power to compensate for this defocus. For example, the apparatus may be configured such that an optical output or output plane of the beam routing apparatus is displaced by at least 0.5%, 0.7%, 1%, 2%, 5%, 10% or 20% of a focal distance of the apparatus (in embodiments, a distance between the optical outputs and a Fourier transform lens of the apparatus). For example, in one embodiment the defocus was approximately 310 µm in 25 mm; in another example the value of s (see later) was 20% of the value of f (see later). Thus in embodiments the apparatus comprises a lens or mirror in an optical path between the SLM and the optical outputs, and the optical outputs are displaced away from a focal plane defined by this lens or mirror, the kinoform compensating for this displacement.

Optionally, in apparatus which is configured by default to be defocussed, a spatial filter may be located at the displaced focal plane to attenuate undiffracted light from the SLM, more particularly to attenuate a zero order region of the output beam.

Additionally or alternatively the apparatus may include a phase mask to modify the wavefront of the output beam, and the kinoform may be configured to compensate for this phase mask, in effect one serving as a matched filter for the other. The phase mask may comprise or consist of a lenslet array (which may be implemented as a diffractive optical element). Additionally or alternatively the phase mask may comprise an axicon array to, by default, displace an output beam into a cone around an optical output (to avoid the optical output).

The skilled person will appreciate that many other alternative phase mask configurations may also be employed: for example a set of phase hologram elements may be employed, one hologram element associated with each optical output. Thus the plurality of optical inputs and outputs may be implemented using a waveguide device that removes the need for a lenslet array. For example (sub)kinoforms can be adapted for a specific wavefront error to ensure that only the +1 or −1 order is coupled efficiently into the selected optical output, the other orders being defocused or aberrated to reduce crosstalk.

The apparatus may have a plurality of optical outputs to provide a multicast or broadcast function. In such an arrangement a different wavefront modification may be applied to light directed to each optical output. The kinoform is configured to direct a selected diffraction order, for example the +1 order, to a plurality of optical outputs, and is adapted to apply a corresponding wavefront compensation (to the selected diffraction order) for each selected optical output. An array of lenses of different focal lengths may be employed to apply the different wavelength modifications to the different optical outputs. Optionally more than one optical input may also be provided.

The skilled person will appreciate that the techniques we describe may be incorporated into apparatus which switches WDM (wavelength division multiplexed) beams.

In embodiments the optical input and outputs may each be provided by a fibre optic (with optical input/output coupling); conveniently a set of optical outputs may be provided by the end of a fibre optic ribbon. In embodiments multiple fibre optic ribbons may be employed to distribute the outputs over a 2D plane, although as described in more detail later, it may be preferable to distribute the optical outputs (fibre optic inputs) over a 3D region of space. Thus, for example, the ends of a set of fibre optic ribbons may be staggered such that each is in a different plane parallel to a plane of the SLM and thus, in effect, the fibre optic ends are distributed over a 3D region (albeit it may be possible to define a tilted 2D plane with respect for the SLM in which the fibre optic ends are located). More generally the ends of a fibre optic array may be arranged to define a set of different planes, to distribute the fibre optic ends in 3D. The skilled person will also appreciate that the optical input and outputs may be displaced transversely with respect to one another, in which case the kinoform may be configured to introduce an angular displacement between the input and output beam or beams. (Such an angular displacement may be implemented by applying a wedge-type phase profile to the SLM either, with a physical wedge or by imposing a modulo $2\pi$ phase profile on the kinoform).

In embodiments the SLM driver is configured to provide kinoform data to a drive output for displaying the kinoform on the SLM. The kinoform may be calculated on-the-fly, for example using a Gerchberg Saxton-type algorithm but alternatively, because the wavefront modification is predetermined, the compensation may also be predetermined and the appropriate kinoform(s) stored in non-volatile memory. Thus the SLM driver may have a beam selection data input to select one or more optical outputs, and in response to this the data processor may retrieve one or more kinoforms from the non-volatile memory in order to direct the input beam to the selected optical output or outputs and, in addition, apply the appropriate wavefront modification compensation. The non-volatile memory may comprise, for example, Flash memory (which may optionally be programmed, or re-programmed, remotely). However since Flash memory may have a limited life in terms of read/write cycles (~1 million) it can be preferable to use more reliable memory, such as ferroelectric random access memory (FRAMs) or magnetic random access memory (MRAM). The data processor may be implemented in software, dedicated hardware, or a combination of the two (depending, in part, on whether or not the kinoform is calculated on-the-fly).

A preferred implementation of the apparatus is as an ROADM (Reconfigurable Optical Add Drop Multiplexer) with an optical fibre input and outputs, optionally configured for use in a WDM system, for example by wavelength de-multiplexing, switching, and re-multiplexing. In some preferred embodiments the SLM is an LCOS (liquid crystal on silicon) SLM. Such an SLM is generally reflective but it is possible to make the silicon thin enough for the SLM to be used in a transmissive mode. However the skilled person will appreciate that alternatively the SLM may be, for example, a MEMS (micro-electromechanical system) SLM.

Although some preferred implementations of the apparatus include a Fourier transform lens between the SLM and optical input/outputs, this is not essential. For example the Fourier transform lens may be omitted and a Fresnel lens incorporated into the kinoform displayed on the SLM. As previously mentioned, optionally the input fibre or fibres may be out of plane as compared with the output fibres.

The apparatus may be configured as a wavelength division multiplexed (WDM) optical switch in which the SLM displays a plurality of kinoforms, one for each wavelength, different spatial regions on the SLM display different kinoforms for the respective different wavelengths. It is preferable, though not essential, for the different (sub) kinoforms to be substantially non-overlapping. Then, in embodiments, the apparatus may include first and second line focussing elements, for example cylindrical lenses, in the optical path to/from the SLM (conveniently the SLM is a reflective SLM). The focuses of said first and second focussing elements may then be arranged to be substantially mutually orthogonal to provide wavefront encoding. More particularly an optical multiplexer-demultiplexer may be included prior to the line focussing elements in the path to the SLM (following these elements in the path from the SLM). One of the line focussing elements then providing focussing of the different wavelengths into different positions onto the SLM plane, and the other line focussing element performs the wavefront encoding by introducing an aberration (astigmatism). In this way each different wavelength may be routed to a different selected output and the corresponding (sub)kinoform modified (to include focussing power) to compensate the selected, say +1, order for the wavefront encoding (astigmatism).

Thus in a related aspect the invention provides a wavelength division multiplexed (WDM) optical switch comprising: at least one optical input to receive an input beam; a plurality of optical outputs; a spatial light modulator (SLM) on an optical path between said optical input and said optical outputs; at least one wavelength division multiplexer-demultiplexer on said optical path to and from said SLM; and first and second line focussing elements on said optical path to and from said SLM, wherein each said line focus element is configured to focus light substantially to a line focus, and wherein the line focuses of said first and second focussing elements are substantially mutually orthogonal.

In embodiments the system may also include a driver for the SLM to display a plurality of kinoforms on the SLM, each to diffract a wavelength of the input beam into an output beam comprising a plurality of diffraction orders. For each wavelength a routed order, say +1 or −1, is directed to a selected optical output, and the corresponding kinoform is adapted to compensate for the line focussing of one of the line focussing elements (that is, for the astigmatism). In preferred implementations different spatial regions on the SLM display different (sub)kinoforms.

In a related aspect the invention provides a method of routing an optical beam, the method comprising: receiving at least one input optical beam at a spatial light modulator (SLM); and diffracting said input optical beam by displaying a kinoform on said SLM to direct a routed diffraction order of said diffracted beam to at least one selected optical output of a plurality of optical outputs; wherein the method further comprises: configuring said apparatus to modify a wavefront of said routed diffracted beam to reduce a coupling of said diffracted beam into said selected optical output; and compensating for said wavefront modifying of said routed diffracted beam using said kinoform, to compensate for said reduced coupling such that a coupling of said diffracted light into others of said optical outputs than said at least one selected optical output is reduced.

Thus in embodiments the apparatus is configured to aberrate a wavefront of the routed or target diffracted beam, for example the +1 (or −1) order, and the kinoform corrects for this. In embodiments the configuration comprises defocusing an optical output, and the kinoform encodes a lens to compensate for this. In embodiments the lens is an off-axis Fresnel lens. More generally the apparatus is configured to provide a matched filter for a wavefront modification pattern displayed on the kinoform.

In a multicast system a different matched filter is provided for each optical output and the kinoform displays a wavefront modification pattern to compensate for matched filters corresponding to selected optical outputs. The matched filter may comprise, for example, an array of lenses and/or axicons.

The invention further provides apparatus comprising means for implementing a method as described above.

BRIEF DESCRIPTION OF THE DRAWINGS

These and other aspects of the invention will now be further described, by way of example only, with reference to the accompanying Figures:

FIG. 8 illustrates maximum crosstalk at each of the 12 target positions for a blazed grating and a wavefront encoded pattern (the filled portion of the bars corresponds to the wavefront encoded pattern, the open portion to the blazed grating pattern);

FIGS. 9a and 9b show example kinoform patterns displayed on an LCOS SLM showing, respectively, a blazed grating covering the whole of the device (a set of straight, horizontal lines); and a wavefront encoded pattern, 500×500 pixels (a set of arcs, similar to a segment of a set of concentric circles, the horizontal lines of FIG. 9a now being curved);

FIGS. 15a and 15b shows the geometry and variables used in mathematical analysis of a fractional Fourier transform system that has a non-planar wavefront incident on the device used to display the kinoform;

DETAILED DESCRIPTION OF PREFERRED EMBODIMENTS

A primary goal when routing telecom signals with a phase modulating spatial light modulator is to deflect the signal beam (+1 order) from one or more input fibres to specific locations in the output fibre plane with a sufficient efficiency that ensures the switch meets insertion loss specifications, and that the power coupled to other fibres in the replay plane meets desired crosstalk specifications. Here we define crosstalk as the light that we wish to deflect to intended fibre locations that is unintentionally coupled into one or more other fibre locations.

We will describe techniques which purposefully introducing a wavefront error into the system, and correcting for this error by displaying an optimized kinoform on the SLM, to thereby maximize the amount of light coupled into the fiber. Due to the symmetry conditions of a hologram, if we correct for this aberration for the +1 order, all other orders are further aberrated. As a result we can reduce the crosstalk in the switch.

Space-Variant and Space-Invariant Switching Schemes

Optical switches based on LCOS technology may use either optical systems that are based on space-invariant optical configurations, where the input and output arrays are at conjugate Fourier planes, or two planes of space-variant sub-holograms with micro-beams deflected between these planes, with the sub-holograms displaying grating patterns.

Figure 1A:
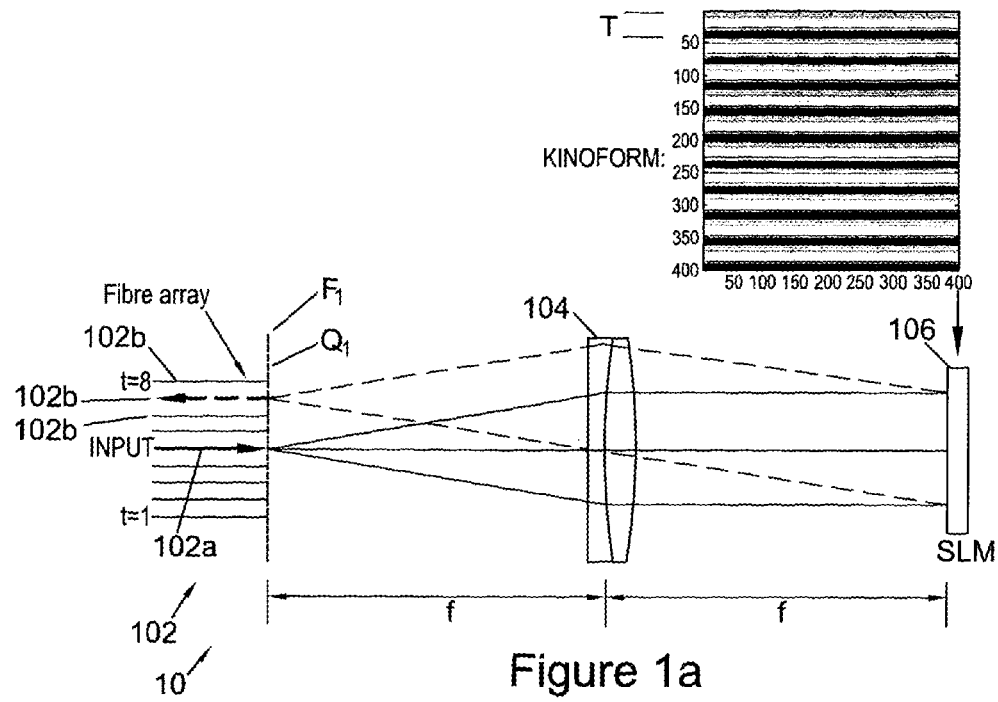
FIGS. 1a to 1c show, respectively, a schematic illustration of optical beam routing apparatus showing a perfectly aligned system; a defocused system employing wavefront encoding; and example optical beam routing apparatus employing wavefront encoding, according to an embodiment of the invention.

To illustrate the first case, consider an LCOS switch 10 based on an input/output fibre array 102, a focusing element 104, such as a lens, and a LCOS SLM 106 arranged in a 2f (or 4f) system, as shown in FIG. 1(a). The optical beam emitted from the fibre is collimated by the focusing element and illuminates a planar (and in this example, reflective) SLM that displays a grating of period T, thereby deflecting the incident collimated beam through an angle θ, where sin(θ)=λ/T. The light diffracted travels back through the lens is focused at the fibre plane $Q_1$, $F_1$ a distance d=f×tan(θ) from the optical axis (assuming paraxial optic theory is valid). Note that this does not preclude the addition of subsequent focusing optics, such as a lenslet array before the input or output fibre planes, or the use of anamorphic optics, such as cylindrical lenses. If anamorphic optics are used, the deflection can occur in one plane only; the plane where the wavefront is planar. However, in this plane the system is still space-invariant. In both the case of a system based on rotationally symmetric focusing elements and/or anamorphic elements the LCOS phase patterns may still be optimised using the kinoform design methods discussed herein.

Systems constructed from a series of space-invariant optical systems may also be used for WDM (Wavelength Division Multiplexed) systems where a dispersion element, such as a grating, volume hologram, or thin film based filter, is used to de-multiplex and multiplex the beam, and for systems that use reflective as opposed to refractive optics.

Figure 2A:
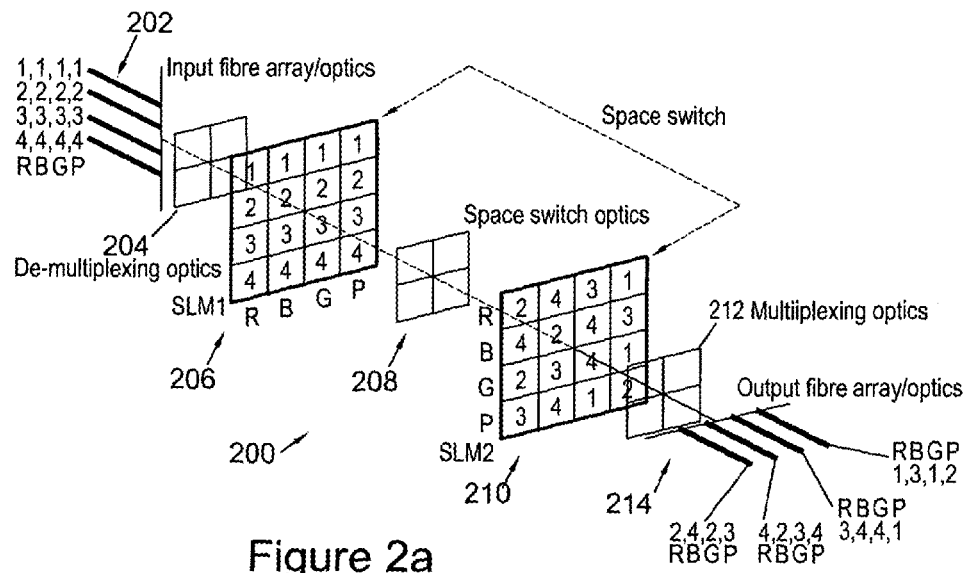
FIGS. 2a to 2c show an example of a wavelength division multiplexed (WDM) optical switch employing two SLMs, the system comprising a linear input fibre array/optics and de-multiplexing optics, two SLM switching planes and related optics that function as a space-switch, multiplexing optics that recombine up to N wavelengths, and a linear output fibre array/optics that couple data out of the switch; a second example of a WDM switch, in which spatially separated blazed gratings are displayed on the SLM; and a WDM optical switch employing wavefront encoding according to an embodiment of the invention, in which different switched wavelengths are diffracted by spatially different regions on the SLM displaying different kinoforms.

Thus in a second type of LCOS based switch 200, the optical system comprises two planes of sub-holograms 206, 210, as shown in FIG. 2. The incident optical signals from a fibre array 202 travel as individual micro-beams according to some pre-defined routing pattern. In FIG. 2, different wavelength beams are denoted by different "colours" labelled by R, G, B, and P (illustratively, red, green, blue, and purple). The incident WDM beams, are de-multiplexed by de-multiplexing optics 204, illuminate a set of sub-holograms on SLM1 206 that deflect them via space switch optics 208 onto SLM2 210. SLM2 then directs the light such that each beam can be multiplexed by multiplexing optics 212 and coupled efficiently into the output fibre array 214. The input and output stages are either space-invariant or space-variant. In this design is that every possible input wavelength/position has its own sub-hologram, and the central interconnection stage is space-variant, allowing any interconnection pattern to be implemented.

Details of Wavefront Encoding

The use of a kinoform approach, where we display a spatially non-periodic phase pattern, allows deflection to a 3D volume rather than a 2D plane, and in embodiments we use this for wavefront encoding. This approach employs the purposeful introduction of a wavefront error, such as defocus, into the optical system to reduce the amount of crosstalk power that is coupled to the output ports. To correct for this aberration, the pattern displayed on a dynamic hologram is adjusted to ensure optimum coupling of the +1 diffraction order into the desired output port, resulting in defocus of the noise orders.

FIGS. 1(*a*) and 1(*b*) illustrate the idea of wavefront encoding based on defocusing. The 2f optical arrangement of FIG. 1(*a*) comprises an input/output fibre array 102 comprising, in this example, a single input fibre 102*a* and a plurality of output fibres 102*b*. The array 102 is positioned at plane $F_1$, and the apparatus also comprises a reflective spatial light modulator 106, and a Fourier transform lens 104 (as previously described). The input signal, launched into the system via a central fibre 102*a*, is collimated, and is then incident on the SLM 106 where a quantized phase-only blazed grating is displayed. The incident beam is diffracted into a number of orders, the power in each, $P_m$, being dependent on the exact nature of the phase pattern, which are focused at plane $Q_1$. Due to the symmetry of this system, planes $Q_1$ and $F_1$ coincide, and the focused beams have the same spot profile, though different peak intensities. This can lead to crosstalk, wherein if we aim to direct the +1 order to one of the output fibres, light remaining in other orders may couple into one or more of the other fibres. To address this problem we purposefully move the fibre array back a distance s from plane $F_1$ to plane $F_2$, and compensate for the defocusing effect by adding a lens function to the grating. This can be done, for example, by displaying an off-axis lens. Combining a grating with a lens results in the diffraction orders being focused at different planes.

Figure 1B:
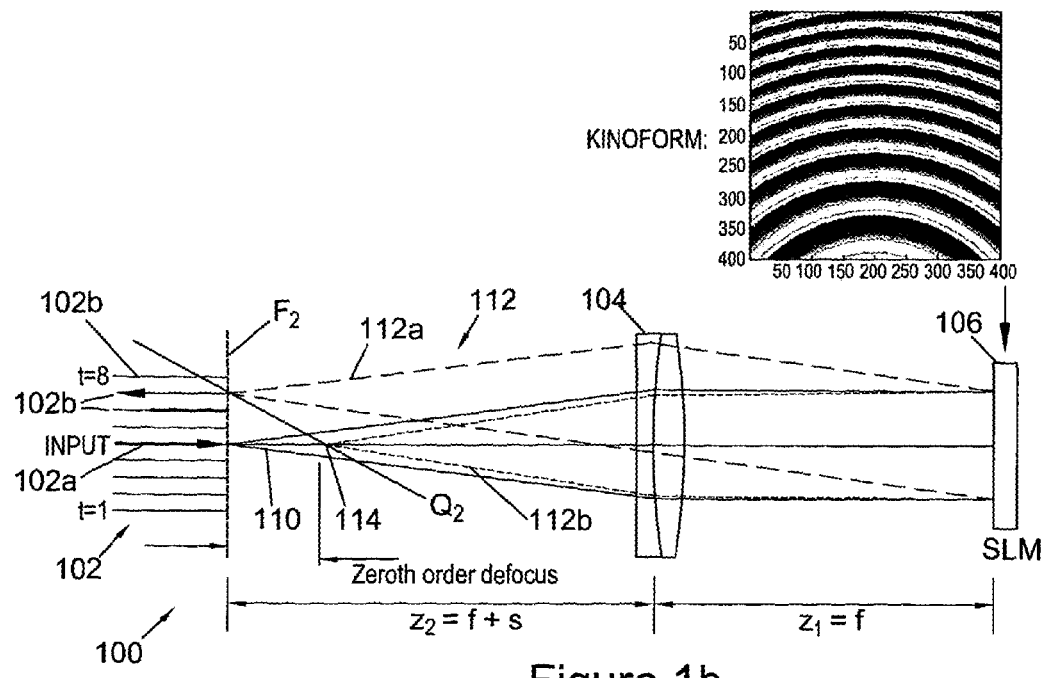

Referring now to FIG. 1*b*, this shows a schematic illustration of defocused optical beam routing apparatus 100 employing wavefront encoding according to an embodiment of the invention. Like elements to those of FIG. 1*a* are indicated by like reference numerals. In FIG. 1*b*, the kinoform incorporates lens power and thus has curved rather than straight "fringes". Thus an input beam 110 from input fibre 102*a* is diffracted by reflective LCOS SLM 106 to provide an output beam 112. If we optimize the SLM pattern (kinoform) such that the +1 order of the output beam 112*a* is focused at plane $F_2$, we will only obtain optimum coupling efficiency for that order; all other orders (see dashed lines of zeroth order 112*b* as an example) are focused on a new surface, $Q_2$, which is no longer co-planar with respect to $P_2$—note that in FIG. 1*b* plane $Q_2$ is tilted. The zeroth order, for example, has a focus at location 114, displaced away from the plane of array 102. (The skilled person will appreciate that it is not essential to employ the arrangement of FIG. 1*b* where the SLM is one focal length behind the lens 104—for example, lens 104 could be attached to the SLM).

Using geometric optics we can show that the defocus of the $m^{th}$ order, d(m), is given by $$d(m) = 2s + \frac{f^2}{f_H}m \qquad (1)$$

where s is the displacement of the output from the focus, f is the focal length of the Fourier transform lens, and $f_H$ is the focal length of the lens on the hologram (kinoform). The condition that the m=+1 order is focused at the output fibre plane for a given defocus value of s is $$f_H = -\frac{f^2}{2s} \qquad (2)$$

The position of the +1 beam at the fibre plane, $p_B$, as a function of off-axis lens offset, $p_L$, can be shown to be $$p_B = \frac{2s}{f}p_L \qquad (3)$$

Figure 1C:
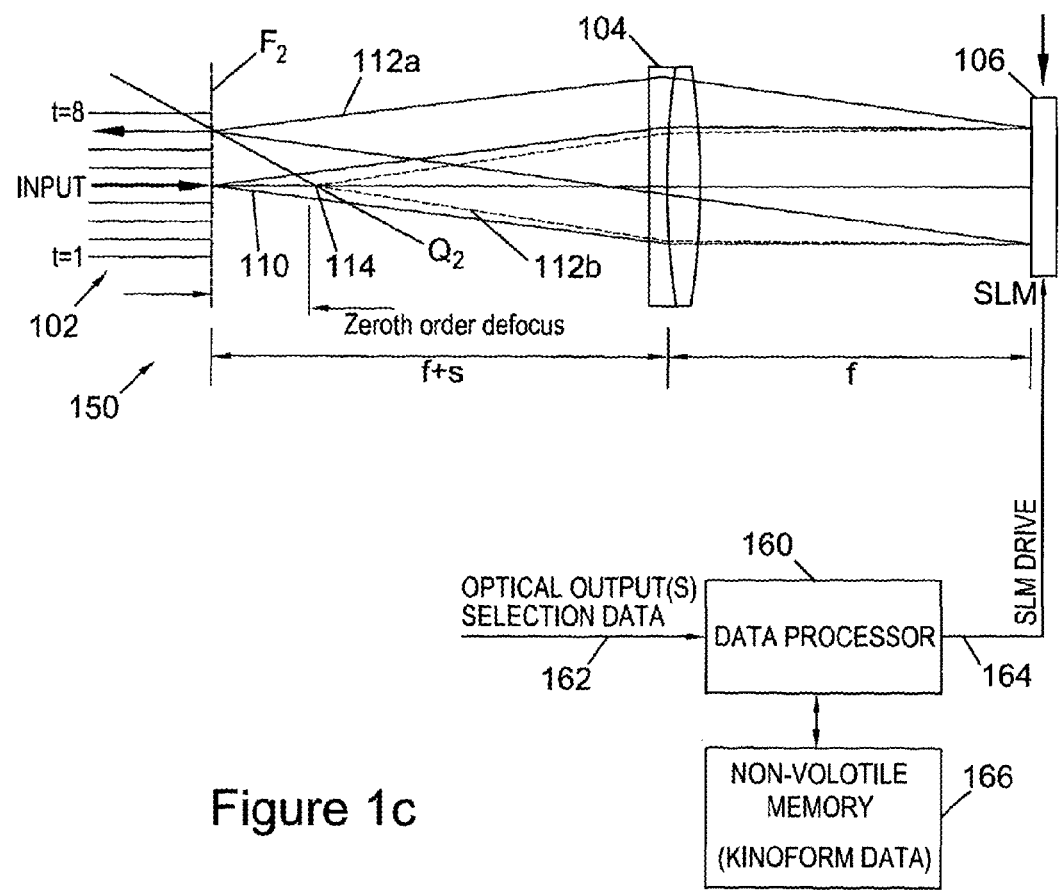

FIG. 1*c* shows a simple practical embodiment of optical beam routing apparatus 150 employing wavefront encoding, according to the invention. Again, like elements to those of FIG. 1*b* are indicated by like reference numerals. The apparatus of FIG. 1*c* includes a data processor 160 having a select input 162 to receive output selection data for selecting one (or more) outputs to which to steer the input beam (or beams). Data processor 160 also provides a drive output 164 for driving SLM 106 with selected kinoform data, and non-volatile memory 166 storing kinoforms for display to i) route the output beam to the selected output(s) and ii) apply a wavefront modification correction for the selected output(s).

Figure 2B:
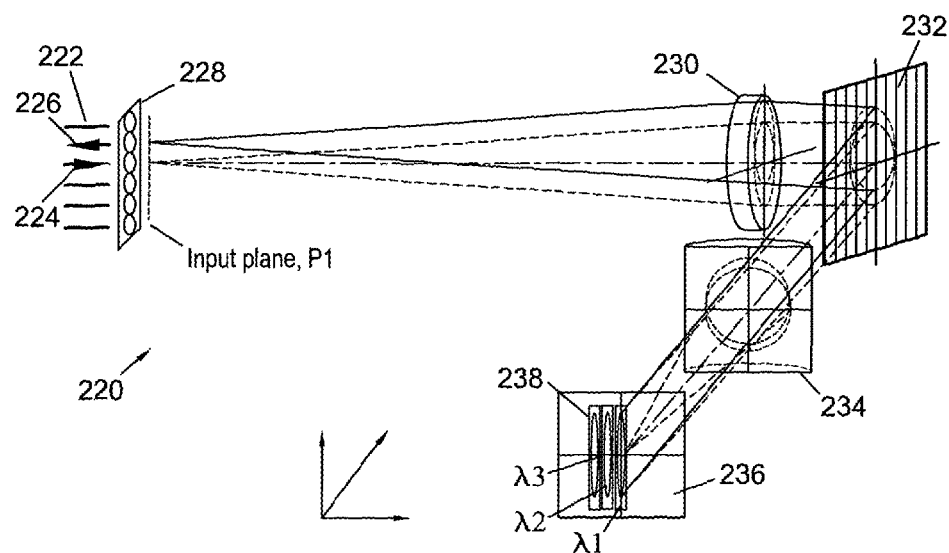
Figure 2C:
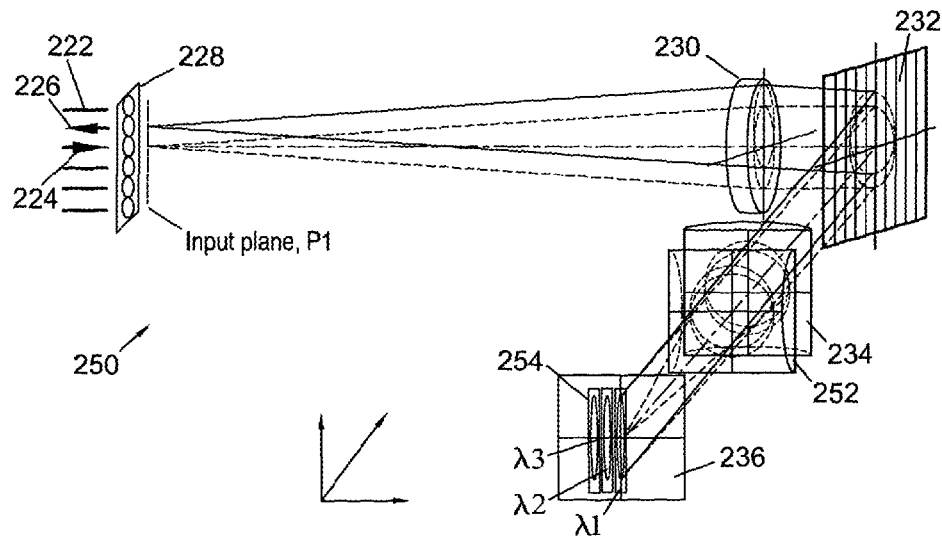

Referring now to FIG. 2*c*, this shows an embodiment of the wavefront encoding technique we describe applied to a WDM switching structure. To explain the operation of FIG. 2*c*, consider first FIG. 2*b*, which shows a WDM switch 220 where independent, spatially separated, periodic blazed gratings are displayed on the SLM to route light from one input fibre to a number of output fibres.

The system comprises: A linear single-mode input/output fibre ribbon array 222; a lenslet array 228 having the same pitch as the fibre array and lenslets of substantially identical focal lengths; a collimating lens 230 of focal length f1; a static transmission grating (multiplexer/demultiplexer) 232 that angularly disperses the WDM wavelengths; a cylindrical lens 234 of focal length (f1)/2; and a reflective spatial light modulator 236.

In FIG. 2*b* each wavelength has its own sub-grating 238 displayed on SLM 236. This is essentially a Fourier-transform based interconnect, where the input/output plane is placed at the front focal plane of a lens, and the SLM placed at the back focal plane. Input data 224 is routed to output 226; different wavelength components of the input data may be routed to different selected outputs.

Light enters from the left via the central fibre, and the corresponding lenslet transforms the input mode field radius from 5.2 µm to 50 µm beam waist at the switch input plane, P1. The reason for this mode conversion is to ensure that the beam entering the switch has a divergence to match the SLM beam steering capabilities, the limited dispersion angle of the static de-multiplexing grating, and the requirement to cover a sufficient number of SLM pixels for efficient diffraction. The input beam is collimated by the collimating lens, de-multiplexed by the static diffraction grating into a linear spread of wavelengths which are focused by the cylindrical lens into an array of elliptical beams on the SLM ready to acquire an angular deflection. In one constructed arrangement, beams cover 400 pixels in the y-direction and 5 pixels in the x-direction. Deflection is in the yz plane. The beam then retraces its steps, is multiplexed by the diffraction grating and any angular displacement it has achieved at the SLM is converted into a positional displacement at the lenslet array. The light is then focused down by a lenslet in front of each fibre to maximize coupling efficiency. Thus individual wavelengths to be independently routed as required by displaying a blazed grating (routing to one fibre) or by a hologram to more than one or more fibres using the techniques described in the first patent.

Preferably, in order to ensure that the light launched into each fibre is normal to that fibre, and that the wavelengths focused onto the SLM plane are normal to the SLM for each wavelength, we arrange the system so that the optics are doubly telecentric. This entails that the distance from the plane P1 to the collimating lens=f1, the distance from the collimating lens to the SLM plane=f1, the distance from the collimating lens to the cylindrical lens=(f1)/2, and thus the distance from the cylindrical lens to the SLM=(f1)/2.

The cylindrical lens focuses each wavelength to a beam waist in the x direction, whilst the light remains collimated in the y-direction. The system of FIG. 2b therefore has similar crosstalk characteristics to the system shown in FIG. 1a as the diffraction orders are all focused at the same plane.

Referring now to FIG. 2c, this shows an example of a WDM switch 250 using wavefront encoding according to an embodiment of the invention, with the aberration introduced by a second cylindrical lens.

To reduce the crosstalk we introduce a purposeful defocus of the light in the zy plane by placing a second cylindrical lens 252 of focal length f2 that is aligned orthogonally to the original cylindrical lens as shown in FIG. 2c. This does not affect the focusing of the light in the xz plane significantly, although we shift the position of the SLM in the local z-direction to compensate for the thickness of the second cylindrical lens (note that the second cylindrical lens 252 can also be placed before the first cylindrical lens 234). However, the light in the yz plane is no longer collimated, but converges. If we displayed a blazed grating, the light focused at the fibre plane would be astigmatic, and would no longer couple efficiently into the output fibres. If, however, we display a non-periodic kinoform, in this case as an off-axis cylindrical lens of the correct focal length, the target order is no longer astigmatic, and therefore couples efficiently into the target fibre. The other diffraction orders of the off-axis cylindrical lens, however, further aberrate, and couple inefficiently. Thus, by adding a cylindrical lens to aberrate the input light and displaying a compensated kinoform, one can reduce crosstalk in the switch. Each wavelength has its own separate sub-kinoform (and these may be optimized for optimum performance using the techniques described in our co-pending UK patent application GB1102715.8).

Figure 3:
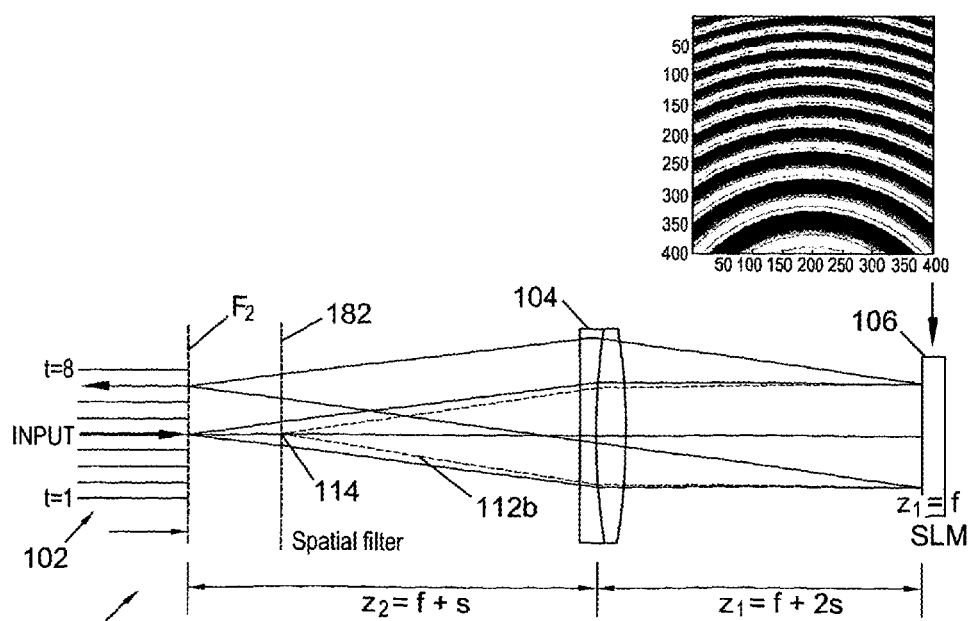
FIG. 3 shows optical beam routing apparatus incorporating zeroth order filtering using defocusing, according to an embodiment of the invention.

FIG. 3 illustrates similar optical beam routing apparatus 180 to that of FIG. 1b, but incorporating a spatial filter 182. This provides a light block at the location of the zeroth order focus 114 to attenuate the zeroth order. The skilled person will appreciate that similar spatial filtering may be incorporated into other embodiments of the invention. In addition, the skilled person will appreciate that using this approach can reduce the transient crosstalk that occurs during the change of an interconnection pattern. When a phase grating is reconfigured from period $T_1$ to $T_2$, optical power can be diffracted to all output locations as the grating displayed on an LCOS SLM is changed due to the periodicity of the changing pattern. Although this can be mitigated by using a step-wise reconfiguration (the phase pattern being changed in a finite number of steps so as to minimise the crosstalk), this will increase the overall reconfiguration time. However, transient crosstalk can be mitigated if we use a wavefront encoded approach. Whilst a pattern is changing there is no localization of optical power at the output fibres due to the lack of symmetry as the pattern is switched.

Experimental Validation of Wavefront Encoding

Figure 4:
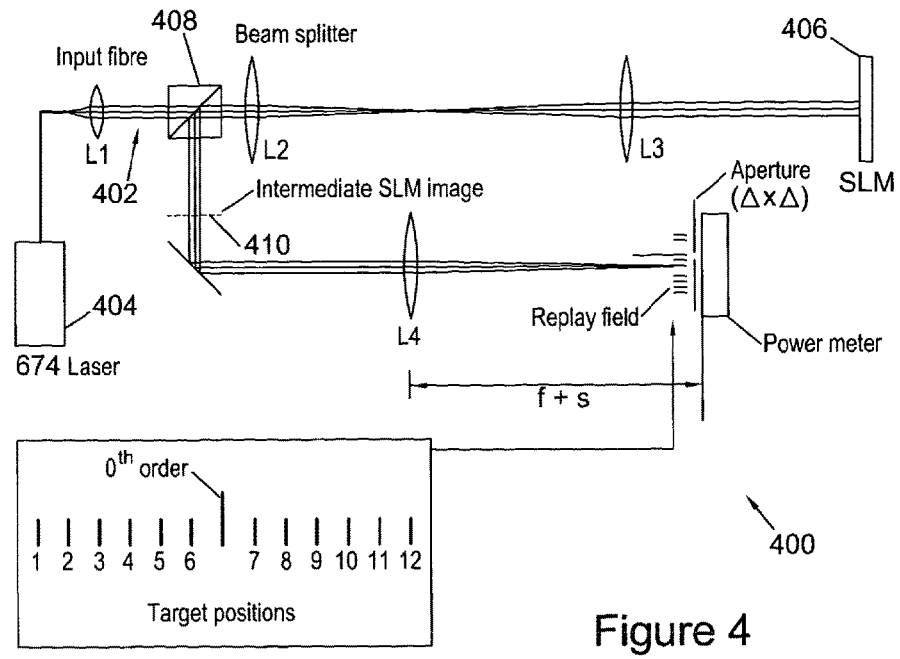
FIG. 4 shows an experimental system for testing wavefront and coding using visible light.

FIG. 4 shows an experimental system 400 that was used to test the concept of wavefront encoding. A collimated beam 402 from a fiber coupled 674 nm diode laser 404 was incident on a reflective nematic LCOS SLM 406 via a beam splitter 408 and a 4f relay system comprising lenses $L_2$ (f=100 mm) and $L_3$ (f=150 mm). These two lenses are not necessary for the technique described here, but were used for test purposes as they allowed one to control the position the beam is incident on the SLM (simultaneous translation of the lenses scanned the beam across the device). Lenses L2 and L3 image the SLM plane at an intermediate plane 410; they comprise demagnifying optics (which increase the angular divergence of the diffracted light).

The beam incident of the SLM had a Gaussian beam radius ($1/e^2$ intensity) of 2.4 mm. The incident light was diffracted by phase patterns displayed on the SLM, and a portion of this diffracted light was reflected by the beam splitter, and focused by $L_4$ (f=200 mm) at the replay plane, where a rectangular aperture of dimensions 120 μm×155 μm was used to pass one diffraction order at a time, and the resultant power measured using a large area photodetector. The SLM had a pixel size of 15 μm×15 μm, with 0.5 μm dead-space. The patterns were displayed across 500×500 pixels using 25 discrete phase levels between 0 to $2\pi$.

Initially a set of blazed gratings was defined that deflected the +1 order to one of twelve target positions across the replay plane, $F_1$. The theoretical and measured beam radii were 26.8 μm and 31 μm respectively. These target positions were located at ±200, ±400, ±600, ±800, ±1000, and ±1200 μm from the optical axis. For a blazed grating, the relationship between positioned deflected to, δ, and period, T, is given (for wavelength λ) by $$\delta = \frac{L_4 L_3}{L_2} \tan\left(a\sin\left(\frac{\lambda}{T}\right)\right) \quad (4)$$

The relationship between target number and physical position is given in Table 1. This relationship takes into account the effect of the relay lenses $L_2$ and $L_3$, which form a de-magnified image of the SLM phase pattern at the intermediate SLM plane 410.

TABLE 1

Twelve target spot locations

| Target position | Physical position (with respect to the optical axis (μm)) |
|---|---|
| 1 | −1200 |
| 2 | −1000 |
| 3 | −800 |
| 4 | −600 |
| 5 | −400 |
| 6 | −200 |

TABLE 1-continued

Twelve target spot locations

| Target position | Physical position (with respect to the optical axis (µm)) |
|---|---|
| 7 | +200 |
| 8 | +400 |
| 9 | +600 |
| 10 | +800 |
| 11 | +1000 |
| 12 | +1200 |

Figure 5:
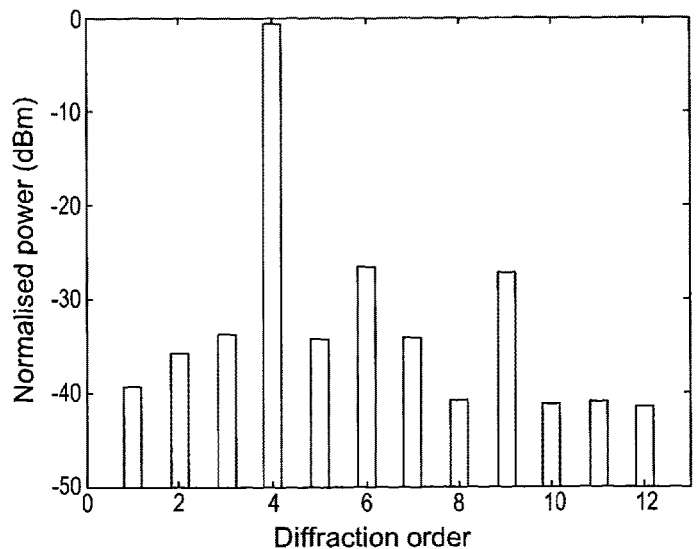
FIG. 5 shows a power spectrum for a blazed grating deflecting to position 4 (period of −22.5 μm) with measured data normalised to a 0 dBm input power.

In order to characterize these aperiodic gratings, the power at each test position was measured as the SLM was cycled to deflect the +1 order to all twelve target positions, resulting in a 12×12 power matrix. FIG. 5 shows a typical power spectrum for such an aperiodic blazed grating (period=22.5 pixels). As can be seen, there is still significant light in orders other than the target +1 order. As mentioned, the high crosstalk values are due to effects such as phase quantization errors, temporal fluctuations, and pixel edge effects producing a non-ideal phase pattern.

A set of wavefront encoded holograms based on spatially non-periodic phase patterns was also calculated to deflect the +1 order to the same transverse positions in plane $F_2$. For this test the pattern was simply defined as an off-axis lens of focal length $f_H$=1.0 meter and offset by a distance $p_L$. This resulted in the replay plane for the +1 order being shifted towards $L_4$ by a distance, s=90 mm.

In FIG. 4, a lens $L_i$ has focal length $L_i$. Referring back to the previous equations, in the arrangement of FIG. 4, $L_4$ corresponds to f, the focal length of the Fourier transform lens. In the equations below the offset (displacement) of the off-axis lens in the hologram plane is denoted $y_H$, which corresponds to the previous term $p_L$. In the intermediate SLM image plane 410 the corresponding displacement is denoted $y_{H2}$, and the effective focal length of the hologram $f_H$ becomes, after demagnification, $f_{H2}$. The geometric optics design equations for the defocus of the $m^{th}$ order, d(m), and the transverse position of the +1 order, $p_B$, are then $$d(m) = -\frac{L_4^2}{h_{H2}} m \quad (5)$$

$$p_B = \frac{y_{H2}}{L_4 + f_{H2}} \left( L_4 + \frac{L_4^2}{f_{H2}} \right) \quad (6)$$

The terms, $y_{H2}$, and $f_{H2}$ represent the effective focal length and lens offset of the de-magnified off-axis lens at the intermediate SLM plane shown on FIG. 4, and are related to the original off-axis lens focal length, $f_H$, and offset $y_H$ ($p_L$) by $$f_{H2} = \left(\frac{L_2}{L_3}\right)^2 f_H \quad (7)$$

$$y_{H2} = \frac{L_2 y_H}{L_3} \quad (8)$$

Thus, if we take into account the relay system lenses, $L_2$ and $L_3$, the de-magnification of the original SLM kinoform pattern increases the defocus. The test aperture was moved to this new plane, and the measurements repeated. The theoretical (calculated using a Gaussian beam model) and measured beam radii are 27.8 µm and 39.5 µm respectively.

Figure 6:
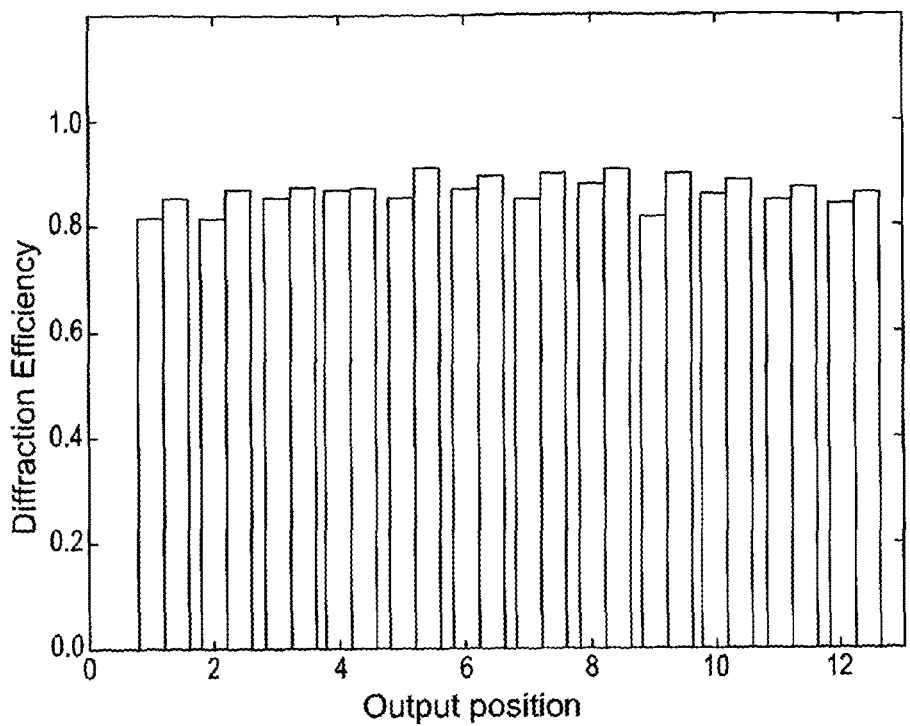
FIG. 6 illustrates diffraction efficiency to each target position for a blazed grating (left hand bar) and an equivalent wavefront encoded pattern (right hand bar)
Figure 7:
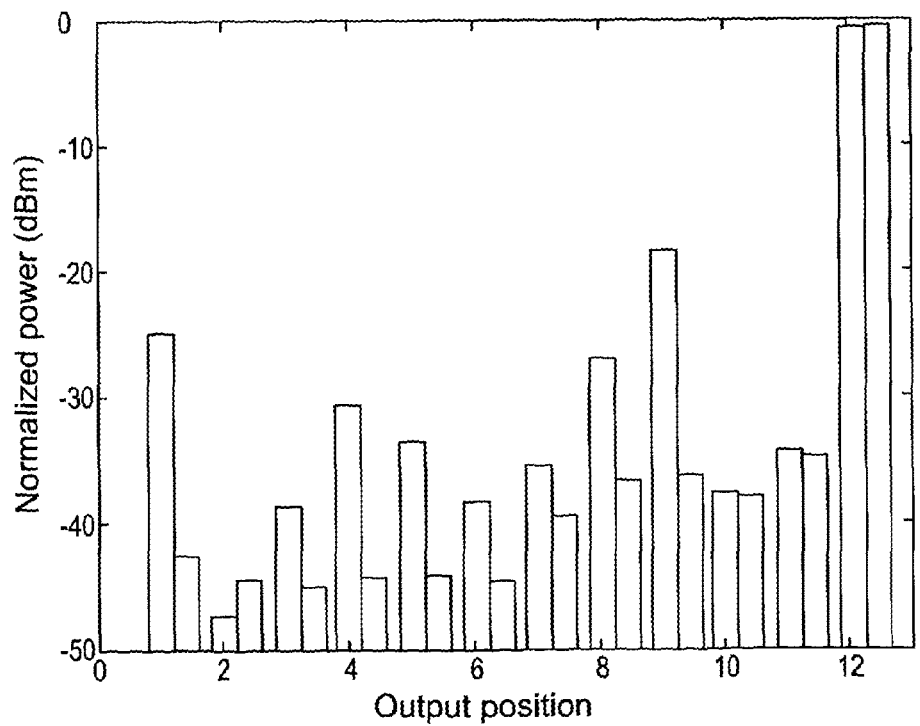
FIG. 7 illustrates measured performances (signal and crosstalk) for the experiment of FIG. 6, illustrating a typical result taken at location 12 with the SLM cycling through all 12 blazed grating and wavefront encoded patterns (the left hand bars are the blazed grating, the right hand bars the wavefront encoding)

FIG. 6 shows the variation in power diffracted in the +1 order when it was deflected to the 12 target positions using either a blazed grating or the wavefront encoded pattern. As can be seen, there is no significant change in diffraction efficiency, with the diffraction efficiency of the blazed grating and wavefront encoded holograms measured to be 86.5±4.0% and 88.4±2.8% respectively. FIG. 7 shows the crosstalk matrix for a sample deflection position (position 12). There is significant suppression of the crosstalk power (light unintentionally deflected to position 12 when the SLM is configured to deflect light to another position) when we use a wavefront encoded system in all but one of the cases. We observe that the crosstalk suppression, defined as the difference between the worst case blazed grating performance and wavefront encoded system performance, is much greater than 12.6 dB (exact value).

FIG. 8 shows the maximum crosstalk at each test position for both the blazed grating patterns and the equivalent wavefront encoded patterns, indicating that crosstalk is always suppressed when defocusing is applied. Experimentally the wavefront encoded system has a maximum crosstalk 12.6 dB lower than that of the equivalent blazed grating pattern. However, the spot size was measured to increase by 27.3%, due to the difficulty in displaying the higher spatial frequencies of off-axis lens, and interference between the various orders at the output plane.

Application of Wavefront Encoding in a Fibre Based Switch

To demonstrate the potential of this technique for fibre applications, a model was set up based on the design shown in FIG. 1. It was based on a single-mode fibre having a Gaussian mode radius of 5.2 µm at 1550 nm, a 25 mm focal length lens, and a reflective SLM on which the phase only patterns were displayed. The patterns, a set of blazed gratings, and a set of spatially non-periodic off-axis diffractive lenses of focal length, $f_H$=−1.0 meter, were optimized for an output port separation of 35 µm, with eight output ports arranged symmetrically about the input. This allowed us to use a waveguide component to convert the 250 µm pitch of a fiber ribbon to 35 µm. Thus, in the case of the wavefront encoded system, a defocus, s, of 0.31 mm, is employed based on the design equations of (1)-(3). A slight modification may be employed to take into account the Gaussian beam propagation characteristics of the light.

Figure 10:
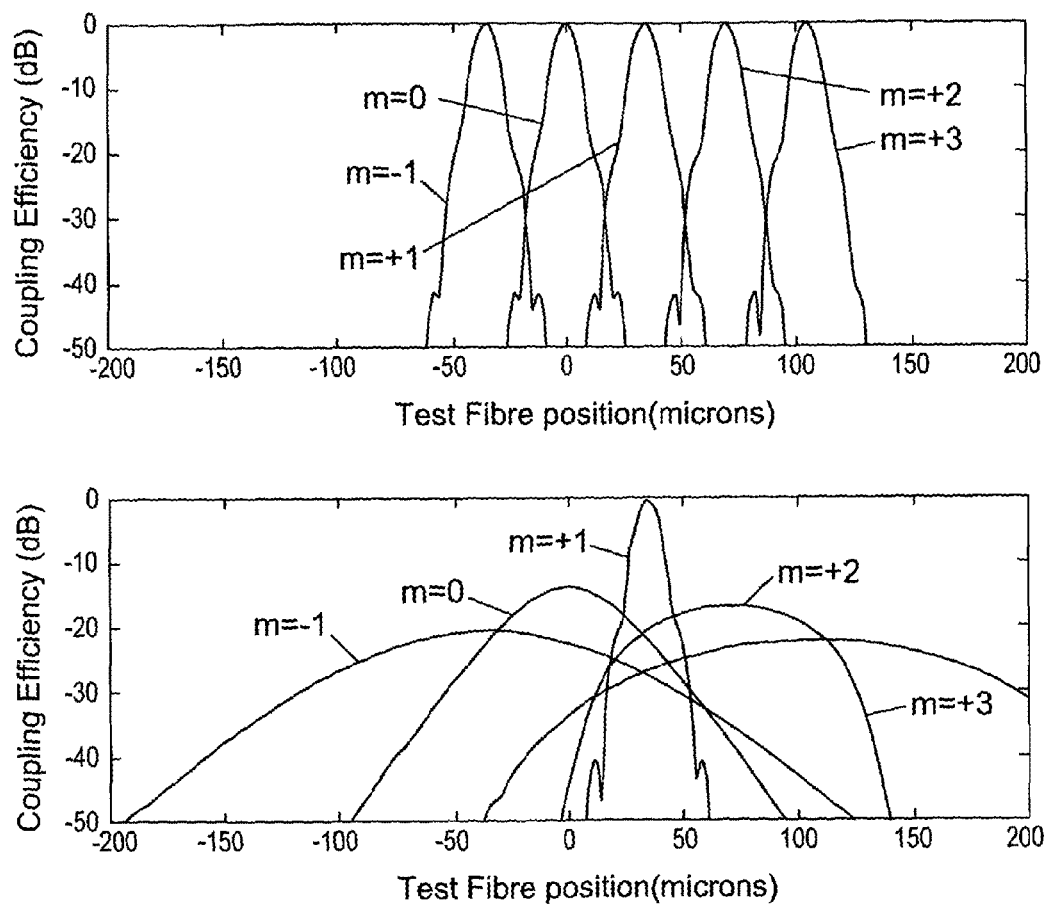
FIG. 10 shows theoretical coupling efficiency variation as a single mode fibre is translated along the +1 order focal plane (plane $F_1$ or $F_2$) for diffraction orders m=0, +/−1, 2 and 3; the target fibre is 35 μm from the input axis, the upper plot shows the arrangement of FIG. 1a, and the lower plot a wavefront encoded system of the type shown in FIG. 1b.
Figure 11:
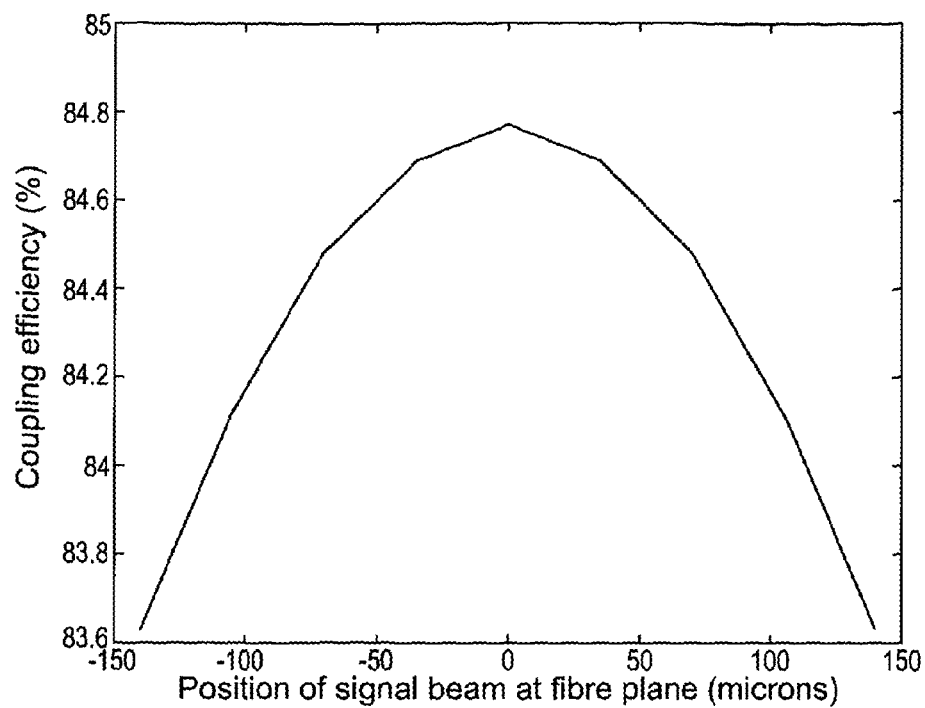
FIG. 11 illustrates the variation of coupling efficiency (%) with the position of the signal beam at the fibre plane (in microns), illustrating the dependence of coupling efficiency of the switch on output beam position.

We can analyze the system of FIG. 1(b) using a Gaussian beam calculation, where $\eta_{mt}$ is the (theoretical) coupling efficiency of $m^{th}$ order into $t^{th}$ fiber or waveguide. To show how $\eta_{mt}$ is dependent on defocus, a mode-overlap integral analysis was run using the ray-tracing package Zemax to illustrate how various diffraction orders couple into a probe fibre as the probe fibre is translated across the output plane. The results are plotted in FIG. 10 for a hologram optimized to deflect the +1 order to a target position 35 µm from the optical axis. The top and lower subplots illustrate the respective behaviour of a standard and the wavefront encoded system. In the case of a system based on blazed gratings, each order is coupled efficiently as a probe fibre is scanned across the fibre plane, with a maximum loss of −0.45 dB when the test fibre is exactly ±140 µm from the optical axis. In the case of a wavefront encoded system, only the +1 order is coupled efficiently, with a loss of −0.72 dB. The maximum loss across all eight output fibres was calculated as −0.77 dB (FIG. 11). This takes into account the fact that the incident beam is no longer parallel to the optical axis of the fibre in a defocused system, and the aberrations introduced by using the lens in a non-Fourier transform arrangement. In this example, wavefront encoding reduces $\eta_{mt}$ for the noise orders by at least 13.5 dB.

Figure 12:
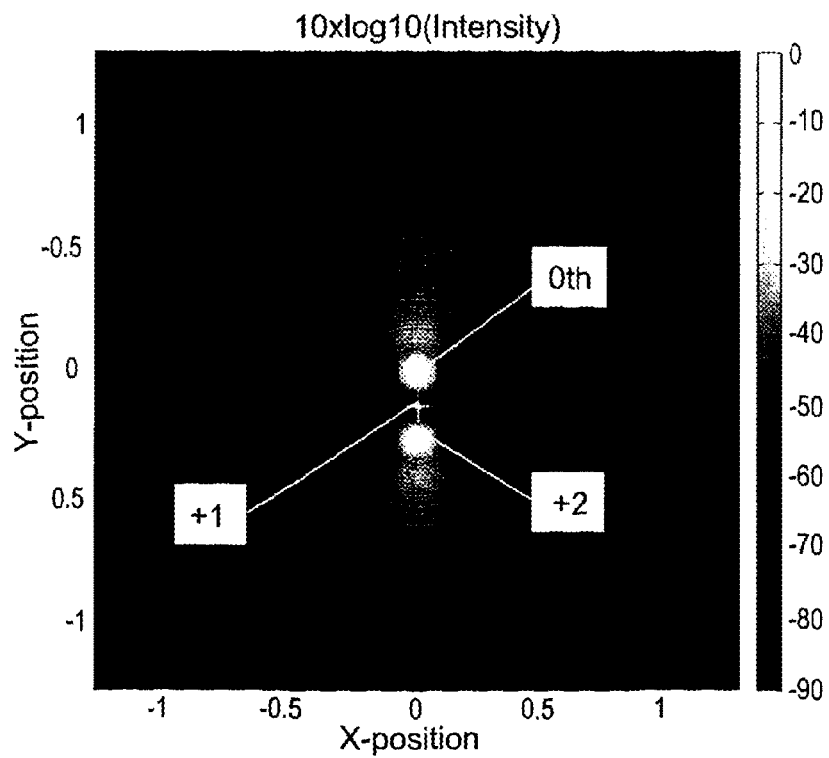
FIG. 12 illustrates a calculated replay field at the focal plane of the +1 order of a 500×500 pixel SLM displaying an off-axis lens with a 10% phase error to emphasise higher orders (the intensity profile is plotted as $10\log_{10}$ (Intensity))

To calculate the actual crosstalk power, we should also take into account the optical powers in these orders. Based on the experimental work, the maximum crosstalk of the wavefront encoded pattern is due to the zeroth order (it contains 3.9% of the total power, relatively because the SLM was not anti-reflection coated). This is verified in FIG. 8, where we see that the highest crosstalk occurs at positions closest to the zeroth order (positions 6 and 7). (However using a suitable anti-reflection coating will reduce the zeroth order power, and a further reduction can be obtained using an iterative algorithm that takes into account the liquid crystal material properties—our GB1102715.8—and/or by employing use a spatial filtering technique, as described with reference to FIG. 3). By extrapolating the same zeroth order power to a wavefront encoded fiber switch, the maximum crosstalk will be [10 $\log_{10}(0.039) - 13.5$] dB=−27.6 dB. However, as can be observed in FIG. 10(b) and FIG. 12, beam defocus spreads the light from all the noise orders across plane $P_2$. Thus the crosstalk should be determined by coherently summing the fields of all orders, and applying a mode-overlap calculation. In addition, the insertion loss of a fiber switch is also dependent on the output spot size as we are coupling into the fundamental mode of a fiber. At 674 nm, an increase in spot size compared to the equivalent blazed grating phase pattern of 27.3% was measured. If we assume the same broadening at 1550 nm, the insertion loss rises by −0.3 dB. The power coupled into the $t^{th}$ fiber or waveguide, can be calculated using a fractional Fast Fourier transform (discussed in the next section) to determine the power distribution at the fibre plane. If we apply a mode overlap integral we can determine the crosstalk. An example of a calculation of the replay field using the fractional Fast Fourier transform is shown in FIG. 12.

Optimization of Kinoform Pattern

The Fourier-transform can be used to design kinoforms for beam-steering switches using an iterative algorithm, such as the Gerchberg-Saxton routine when the replay field is located at the Fourier plane of a lens. In a wavefront encoded system based on the purposeful introduction of defocusing, we no longer have the replay field positioned at the Fourier plane of replay lens, but at some alternative plane longitudinally shifted by a distance s, such that $z_2 = f+s$. Thus we should use some other transform to relate the field at the kinoform plane to the replay plane. One such algorithm is the fractional Fourier transform. (An alternative calculation approach is to consider the one or more optical outputs as point sources and to propagate waves back from these to define the desired phase and amplitude at a selected plane, until the kinoform is reached).

Fractional Fourier Transform

Mathematical Perspective

The fractional Fourier transform is a well known function that has been used in optics, signal processing, and quantum mechanics. From a pure mathematics perspective, it can be expressed as $$E_1(u', v') = \int_{-\infty}^{\infty}\int_{-\infty}^{\infty} K_A(x', y', u', v') E_H(x', y') dx' dy' \qquad (9)$$

where $$K_A(x', y', u', v') = A_\phi \exp[i\pi(\cot(\phi)u'^2 - 2\csc(\phi)u'x' + \cot(\phi)x'^2)] \times \qquad (10)$$
$$A_\phi \exp[i\pi(\cot(\phi)v'^2 - 2\csc(\phi)v'y' + \cot(\phi)y'^2)]$$

$$\phi = \frac{a\pi}{2} \qquad (11)$$

$$A_\phi = \sqrt{1 - i\cot\phi} \qquad (12)$$

The term $A_\phi$ is simply a system constant, and when a=1 we have the standard Fourier transform. From inspection we can infer that the form of equation (9, 10) is due to a quadratic phase factor added to a Fourier transform, the same sort of factor a lens imparts on an optical field.

From the Optics Perspective

A Fourier transform directly relates an input field to the spatial frequency components making up that field. There are many texts that describe the fractional Fourier transform as relating the same input field to an intermediate plane that can be described as comprising a combination of spatial and frequency elements [see, for example, H. M. Ozaktas and D. Mendlovic, "Fractional Fourier optics", J. Opt. Soc. Am. A, 12, pp 743-748 (1995); and L. M. Bernardo, "ABCD matrix formalism of fractional Fourier optics", Opt. Eng. 35, pp 732-740 (1996)].

Any optical system comprising an input plane, an output plane, and a set of optics in between can be represented using an ABCD matrix (used in ray-tracing and Gaussian beam propagation theory). According to S. A. Collins, "Lens-System Diffraction Integral Written in Terms of Matrix Optics", J. Opt. Soc. Am, 60, pp 1168-1177 (1970), diffraction through lens systems can be defined in terms of the ABCD matrix that results in an overall expression of the output field with respect to the input field and ABCD matrix coefficients as:

$$E_1(u, v) = \int_{-\infty}^{\infty}\int_{-\infty}^{\infty} E_H(x, y) \qquad (13)$$
$$\exp\left(-i\frac{k}{2B}[A(x^2+y^2) + D(u^2+v^2) - 2(xu+yv)]\right) dx dy$$

If the ABCD matrix meets certain symmetry conditions (see Collins, ibid), we can rearrange equation (13) to the same form as equation (9-12). Hence we have a fractional Fourier transform. There are two standard configurations, the Lohmann type I and II geometries [A. W. Lohmann, "Image rotation, Wigner rotation, and the fractional Fourier transform", J. Opt. Soc. Am A, 10, 2181-2186 (1993)]. It is the first (lens positioned halfway between the input and output planes) that we are interested in at the moment as it comes closest to representing wavefront encoding using defocusing. This entails that the distance from the SLM to the focusing lens, and the distance from the focusing lens to the replay plane (+1 order focal plane), both equal f+s, where f is the focal length of the focusing lens, and s is the defocus. If this is the case, then we can express $\phi$ as $$\cos\phi = 1 - \frac{f+s}{f} \qquad (14)$$

Figure 13:
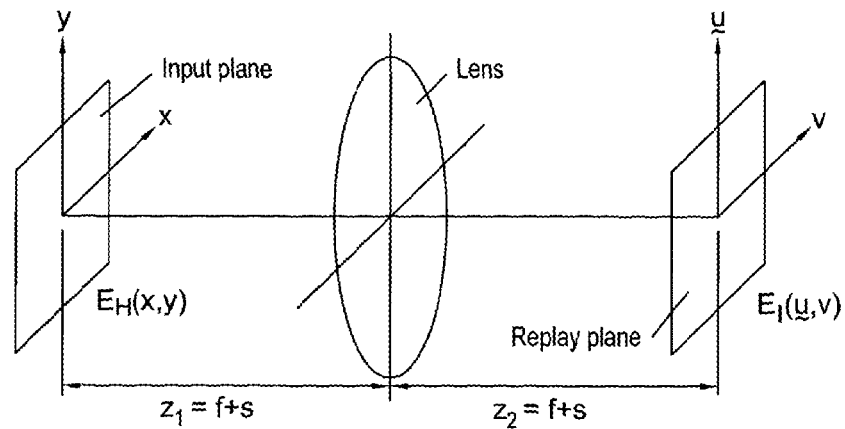
FIG. 13 shows the geometry and variables used in the mathematical analysis of a Lohmann type I fractional Fourier transform optical system.

Let us assume that we have a fractional Fourier-transform system, as shown in FIG. 13, comprising a single lens, and input field, $E_H(x,y)$, positioned a distance $z_1$ in front of this plane, and the output plane positioned at distance $z_2 = z_1$ behind the lens, where a field, $E_I(u,v)$, is generated. For generality we set $z_1 = f+s$. The scaling factor, $\xi$, which relates the transverse scale of the input and replay fields to s using the transforms x'=x/$\xi$, y'=y/$\xi$, u'=u/$\xi$, and v'=v/$\xi$. This has a value of $$\xi^4 = \lambda^2 (f+s) f\left(2 - \frac{f+s}{f}\right) \qquad (15)$$

Thus, if s=0, we have a=1 and $\xi^2 = \lambda t$ and equation (9) simplifies to the standard Fourier Transform relationship for an optical system of the type of FIG. 1a:

$$E_I(u, v) = \int\int_{-\infty}^{\infty} \exp\left(-i\frac{2\pi}{f\lambda}(xu + yv)\right) E_H(x, y) \, dx \, dy \quad (16)$$

Figure 14:
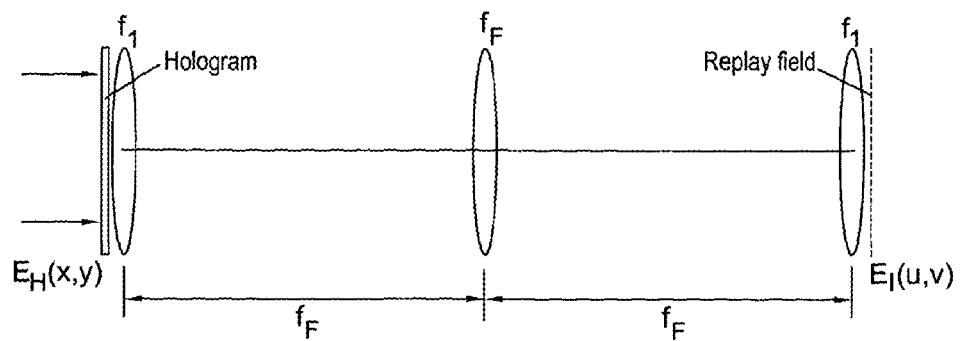
FIG. 14 shows the geometry and variables used in mathematical analysis of a Lohmann type I fractional Fourier transform optical system based on an equivalent three lens optical representation.

One of the advantages of using a fractional Fourier transform is that it can be expressed in terms of fast Fourier transforms, thereby allowing for rapid calculation and optimization of the replay field as described by Ozaktas et al [H. M. Ozaktas, O. Arikan, M. A. Kutay, and G. Bozdagi, "Digital computation of the fractional Fourier transform", IEEE Transactions on Signal Processing, 44, 2141-2150 (1996)]. The design of diffractive elements by this fast fractional Fourier transform approach was reported by Zhang et al [Y. Zhang, B. Z. Dong, B. Y Gu, and G. Z. Yang, "Beam shaping in the fractional Fourier transform domain", J. Opt. Soc. A, 15, 1114-1120 (1998)], and Zalevsky et al [Z. Zalevsky, D. Mendlovic, and R. G. Dorsch, "Gerchberg-Saxton algorithm applied to the fractional Fourier or the Fresnel domain", Optics Letters 21, 842-844 (1996)]. Their analyses showed that certain sampling criteria should be met to ensure an accurate representation of the replay field. To circumvent this issue one can use the equivalent optical system approach developed by Testorf [M. Testorf, "Design of diffractive optical elements for the fractional Fourier transform domain: phase-space approach", Appl. Opt. 45, 76-82 (2006)]. This allows calculation of the replay field for any fractional order. In Testorf's analysis, the Lohmann type I system of FIG. 13 was replaced by an equivalent three lens system as shown in FIG. 14. The input plane is immediately before the first lens, and the output lens is immediately after the last lens. The distance from the first lens to the central lens is $f_f$, and the distance from the central lens is likewise $f_f$. The first and last lenses have a focal length of $f_1$, and the central lens has a focal length of $f_f$. This system has an ABCD matrix with the required symmetry for a fractional Fourier transform to be applied if we set the values for $f_F$ and $f_1$ as $$f_F = f \sin^2\phi \quad (17a)$$

$$f_1 = -\frac{f_F}{\cos\phi} \quad (17b)$$

where f is the focal length of the lens of FIG. 1b, and $\phi$ is given by equation (14).

In the paper by L. Bernardo, "ABCD matrix formalism of fractional Fourier optics" (ibid), it is shown how to describe an optical system where the beam illuminating the input plane (the SLM plane) is not planar in terms of a fractional FFT. This is the situation for the wavefront encoded system based on defocusing described above.

Let us consider FIG. 15a, which shows the switch of FIG. 1b unfolded into a transmission system to more clearly relate how the optical system parameters affect the formulation of the fractional Fourier transform. The input fiber is positioned at plane $P_{IN}$, whilst the output fibers are positioned at planes $P_R$ (both equivalent to $F_2$ in FIG. 1b). Lenses $L_1$ and $L_2$ are identical, and have a focal length of f. Let us consider the case where $z_2=f+s$, with s being positive. The wavefront incident on $\Sigma_H$ is therefore convergent, and the beam focused a distance $d_o$ from the lens as shown. The distance from the $\Sigma_H$ to the focal plane is given by $d_H=d_o-z_1$. As a result, the radius of curvature of the incident beam at $\Sigma_H$, $\rho_H=-d_H$, is given by $$\rho_H = z_1 - f - \frac{f^2}{s} \quad (18)$$

where $\rho_H$ is negative if the beam incident on the hologram is focused to the right of $\Sigma_H$, and positive appears to come from a virtual focus to the left of $\Sigma_H$. Equation (18) is derived by applying the thin lens formula to FIG. 15b. According to the analysis Bernardo and Soares [L. M. Bernardo and O. D. Soares, "Fractional Fourier transforms and imaging", J. Opt. Soc. Am. A, 11, 2622-2626 (1994)], for a fractional Fourier transform to be valid when the hologram plane is illuminated by a non-planar wavefront, $z_2$, must be related to $z_1$ and $p_H$ by $$z_2 = \frac{\rho_H + f}{\rho_H + z_1 - f} z_1 \quad (19)$$

Thus we can determine the optimum value of $z_1$ such that the system of FIG. 15(a) performs a fractional Fourier transform by combining equation (18) with equation (19) and solving the resultant quadratic equation to give $z_1=f+2s$. If we meet this condition, the system of FIG. 15 (non planar beam incident on the SLM) converts to case shown in FIG. 13 (planar beam incident on the SLM). However, we now have $z_1=z_2=f+2s$, with a is given by equation (14) using a modified lens focal length, $f_p$, of $$f_p = \frac{\rho_H f}{\rho_H + z_1 - f} \quad (20)$$

This scaled focal length and new value of $\phi$ takes into account the nature of the non-planar beam incident on the hologram plane, and with these new parameters we can use the equivalent model representation described previously to calculate the replay field of a quantized SLM in a wavefront encoded switch. With reference to FIG. 15(a), the focal length of the holographic lens, $f_H$, required to focus an incident wavefront with radius of curvature $-\rho_H$ at the replay plane must be such that the wavefront of curvature of the +1 order exiting the SLM is also $-\rho_H$. This ensures that the light diffracted from the SLM is optimally focused into the output fibers. Thus, from geometric optics $$f_H=-(\tfrac{1}{2})\rho_H \quad (21)$$

Note that the above analysis is valid for a transmissive SLM. In the case the reflective SLM of FIG. 3, the required focal length is the negative of Equation (21).

From the Kinoform Optimization Perspective

As will be shown by example, the fractional FFT fits straightforwardly into "ping pong" algorithms. (Broadly speaking a "ping pong" algorithm comprises initialising a phase distribution for the kinoform, for example randomly or based on an initial target replay field, calculating a replay field of the kinoform, modifying an amplitude distribution of the replay field but retaining the phase distribution, converting this modified replay field to an updated kinoform and then repeating the calculating and modifying to converge on a desired target replay field).

Fourier transforms are fast and therefore well suited to calculating replay field and in optimizing the kinoform phase pattern in standard Fourier plane systems. According to Ozaktas et al [H. M. Ozaktas, O. Arikan, M. A. Kutay, and G. Bozdagi, "Digital computation of the fractional Fourier transform", IEEE Transactions on Signal Processing, 44, pp 2141-2150 (1996)], it is possible to convert equations (9-12) to a form that uses standard FFTs and IFFTs. There are other algorithms that can be used to calculate the replay field in a wavefront encoded system (direct Fresnel integral for example). However, according to Ozaktas et al, using a Fresnel integral based solution uses $O[N^2]$ calculations, whilst using their implementation we use $O[N\times\log(N)]$ steps. It is faster than other approaches provided that the associated limitations on the optical geometry are acceptable.

Using the equivalent method developed by Testorf we calculate the replay field, $E_I(u,v)$, using only four steps. Firstly the plane wavefront, which we denote as $E_{in}(x,y)$ to take into account any amplitude profile, is incident on the SLM (shown in transmission in FIG. 3). The pixilated LCOS SLM is assumed to display a phase-only hologram represented by $\alpha(x,y)$, where $0 \le \alpha(x,y) < 2\pi$. The resulting transmitted wavefront, $E_H(x,y)$, is the product of these two terms. In step 2, the first lens of FIG. 13, $f_1$, imparts a quadratic phase curvature on $E_H(x,y)$. In step 3, the central lens, $f_f$, performs a Fourier-transform on the wavefront exiting lens $f_1$. Finally, the last lens of FIG. 13, $f_2$, imparts a quadratic phase curvature on the wavefront such that the output field, $E_I(u,v)$ is given by $$E_I(u,v) = FT\left(E_{in}(x,y)\exp(i\alpha(x,y))\exp\left[\frac{-ik(x^2+y^2)}{2f_1}\right]\right)\exp\left[\frac{-ik(u^2+v^2)}{2f_2}\right] \quad (22)$$

Where $f_1=f_2$. We write this as $E_1(u,v)=\text{FrFFT}(E_H(x,y))$. In the actual calculation we use an FFT for step 3, with a spatial sampling corresponding to the N×N pixels of the SLM plane. Thus the fields at all planes are uniformly spatially sampled on an N×N grid, with the sampled u coordinate being given by $$u = n\frac{\lambda f_f}{N\Delta} \quad (23)$$

where $\Delta$ is the pixel size, and n is an integer varying from $-N/2$ to $N/2$. The same scaling factor relates v to y. As shown in FIG. 12, this technique can be modified to handle a two-dimensional kinoform and replay plane.

In the case of the system of FIG. 3, where the incident beam is non-planar, we set $z_1=f+2s$ and $z_2=f+s$. To convert this to the model of FIG. 14, the effective focal length, $f_p$, is calculated using equation 20. We then set $f=f_p$ and calculate $\phi$, $f_F$, and $f_1$ using equations 14, 17a, and 17b. The wavefront at the hologram plane is now treated as plane, but with the original amplitude distribution—for example Gaussian. This allows us to calculate the replay, as required for kinoform optimization.

For further background information on fractional Fourier transforms reference may be made to the following sources: H. M. Ozaktas, "The Fractional Fourier Transform: with Applications in Optics and Signal Processing", John Wiley & Sons (2001); A. W. Lohmann, "Image rotation, Wigner rotation, and the fractional Fourier transform", J. Opt. Soc. Am A, 10, pp 2181-2186 (1993); I. Moreno, J. A. Davis, and K. Crabtree, "Fractional Fourier transform optical system with programmable diffractive lenses", Appl. Opt. 42, pp. 6544-6548 (2003); D. Palima and V. R. Darla, "Holographic projection of arbitrary light patterns with a suppressed zeroth-order beam", Appl. Opt. 46, pp 4197-4201 (2007); S-C Pei and M-H Yeh, "Two dimensional fractional Fourier transform", Signal Processing 67, 99-108 (1998); and X. Y. Yang, Q. Tan, X Wei, Y Xiang, Y. Yan, and G. Jin, "Improved fast fractional-Fourier-transform algorithm", J. Opt. Soc. Am. A, 21, 1677-1681 (2004). Fractional fast Fourier transform code available from the following web sites: www2.cs.kuleuven.be/~nalag/research/software/FRFT/— for 1D code, and www.ee.bilkent.edy.tr/~haldun/fracF.m— for 2D code.

Figure 16A:
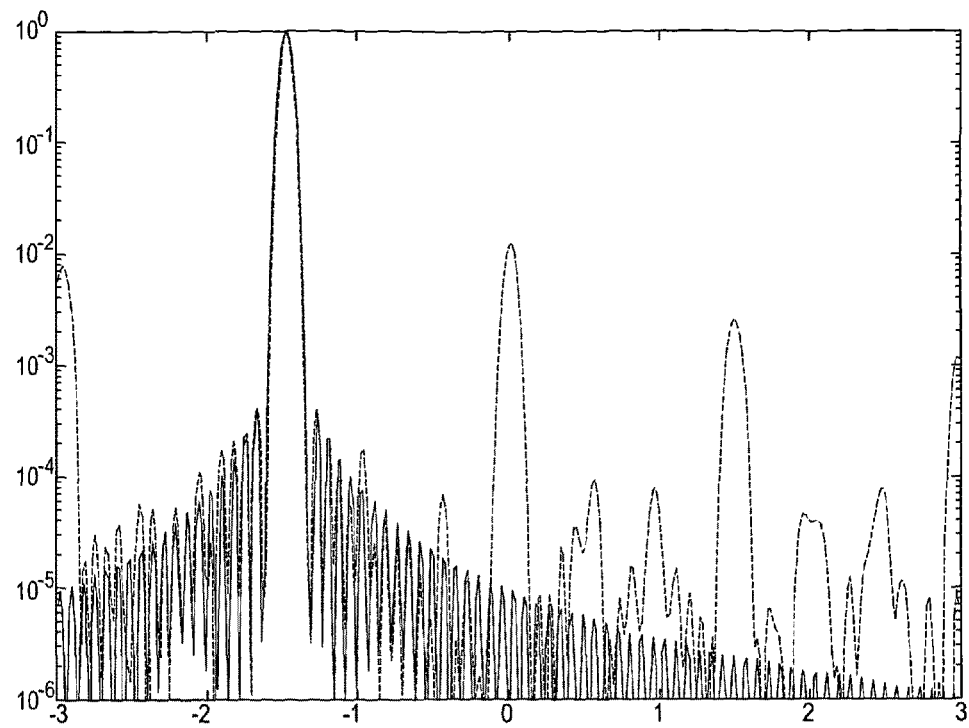
FIGS. 16a and 16b illustrate a grating pattern optimised using a Gerchberg-Saxton (GS) algorithm illustrating respectively, a replay field of a blazed grating with a perfect replay (lower curve) and a 10% phase error (upper curve), and a corresponding phase profile.
Figure 16B:
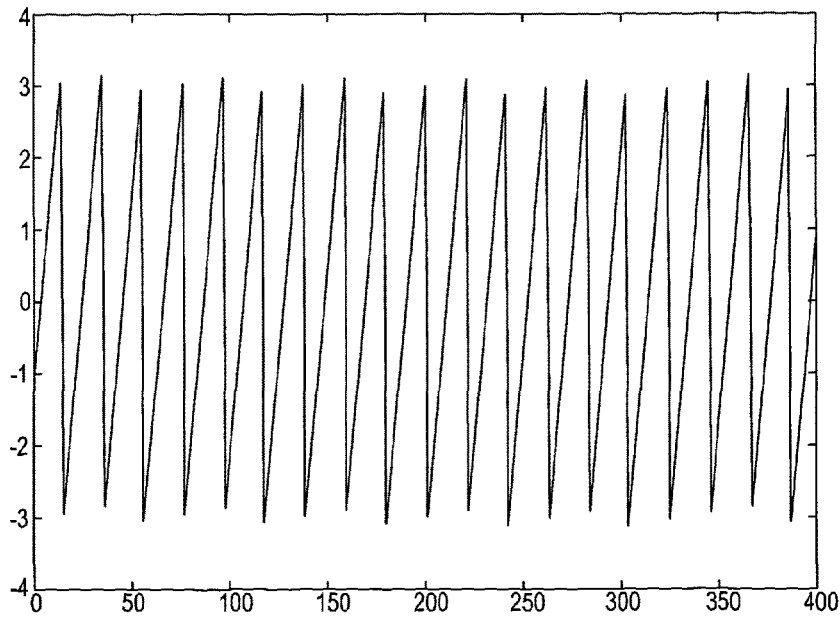

Case 1—Optimization of a Kinoform in a Fourier Plane System Using the Gerchberg Saxton Algorithm FIG. 16a shows the replay field and FIG. 16b the subsequent kinoform pattern, when we use the Gerchberg Saxton algorithm to optimize the phase pattern. This is an example of a "ping-pong" algorithm. The program used to generate the kinoform was based on Matlab code, which has the basic form:

```
gin = Amplitude distribution of input field (Gaussian profile assumed)
grossout = Desired output field (the target function).  For example,
if we have GN
addressable output points
grossout = zeros(GN);
grossout(position 1) = 1;
grossout(position 2) = 1;
Sets two points to have equal amplitude and the other points zero
amplitude
gprime = Kinoform phase pattern
for ite=1:200
        if ite==1
        % start with result of geometrical ray-tracing (initial starting
point - FFT of input field)
            ftg=fftshift(fft(fftshift(gin)));
        else
        % All other iterations use this (FFT of input field×exp(i*phase
of hologram))
            ftg=fftshift(fft(fftshift(gin.*exp(i.*gprime))));
        end
        % Calculate the phase of ftg (dump amplitude information)
        angle_ftg=angle(ftg);
        % Then to get the hologram phase we take the IFFT of the
target function multiplied by
             exp(i*the phase of angle_ftg)
             gprime=angle(fftshift(ifft(fftshift(grossout.*exp(i.*angle_ftg)))));
end
```

For this calculation the SLM comprised a linear array of 400 pixels of pixel size 15 μm, with the SLM illuminated by a collimated Gaussian replay field of beam radius 2 mm at a wavelength of 1550 nm. The replay position is located −0.75 mm from the optical axis, and the phase values were allowed to take any value between 0 and $2\pi$.

FIG. 16a shows the situation of ideal replay (lower curve), and where there is a 10% error in the blazed grating uniformly applied across all pixels (upper curve). As can be seen, the crosstalk increases at the positions associated with higher and symmetric orders. Typically, in a fiber based switch, the fibers would be positioned at these locations due to the availability of low cost fiber ribbons on uniform pitches.

Case 2—Optimization of a Kinoform in a Defocused System Using a Modified Gerchberg-Saxton Algorithm To optimize the replay field using a fractional FFT of order a, written as FrFFT[field, a], we can modify the Gerchberg Saxton "ping-pong" algorithm as follows below (other algorithms, in particular other "ping-pong" algorithms may alternatively be employed).

```
gin = Amplitude distribution of input field (Gaussian profile assumed)
grossout = Desired output field (the target function).  For example,
if we have GN
```

-continued

```
addressable output points
grossout = zeros(GN);
grossout(position 1) = 1;
grossout(position 2) = 1;
Sets two points to have equal amplitude and the other points zero
amplitude
gprime = Kinoform phase pattern
for ite=1:200
        if ite==1
        % start with result of geometrical ray-tracing (initial starting
point - FFT of input field)
            ftg=FrFFT(gin, a);
        else
        % All other iterations use this (FFT of input field×exp(i*phase
    of hologram))
            ftg=FrFFT(gin.*exp(i.*gprime, a);
        end
        % Calculate the phase of ftg (dump amplitude information)
        angle_ftg=angle(ftg);
        % Then to get the hologram phase we take the IFFT of the
target function multiplied by
            exp(i*the phase of angle_ftg)
        gprime=angle(FrFFT(grossout.*exp(i.*angle_ftg), 2-a);
```

Here the fractional Fourier transform FrFFT may be implemented using standard FFTs available in off-the-shelf code. We make use of the fact that an inverse FrFFT of a FrFFT [field, a] can be calculated using FrFFT[field, 2-a] [see for example Ozaktas, ibid].

Figure 17A:
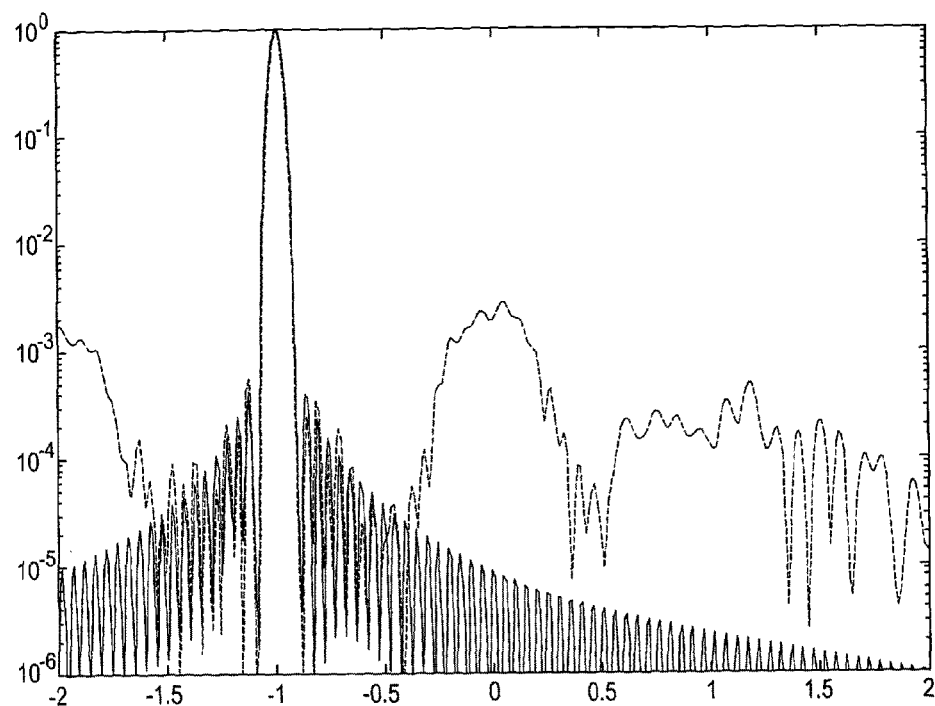
FIGS. 17a and 17b illustrate a grating kinoform pattern for a wavefront encoded system optimised using a modified GS algorithm illustrating, respectively, a replay field of a blazed grating with perfect replay (lower curve) and a 10% phase error (upper curve), and the corresponding phase profile.
Figure 17B:
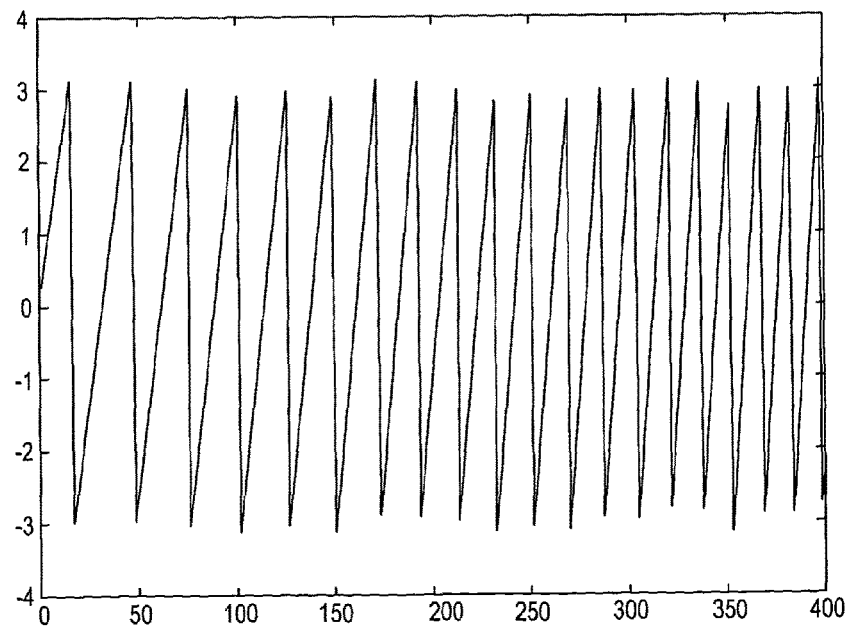

FIG. 17a shows the replay field and FIG. 17b and subsequent kinoform when we use this modified algorithm to optimize the phase pattern. The calculation assumes the same system parameters used for CASE 1, with the phase values taking any value between 0 and $2\pi$. As can be seen the replay field is almost identical to that for Case 1 for a perfect pattern (blue curve). FIG. 17a also shows the situation where a 10% error in the kinoform is uniformly applied across all pixels (upper curve). As can be seen, the crosstalk increases, but is spread across the replay field. When we take into account the mode-overlap integral used to determine how much light is actually coupled into the fibres, the crosstalk can suppressed by more than an order of magnitude.

Multi-Casting with FrFFT

Figure 18A:
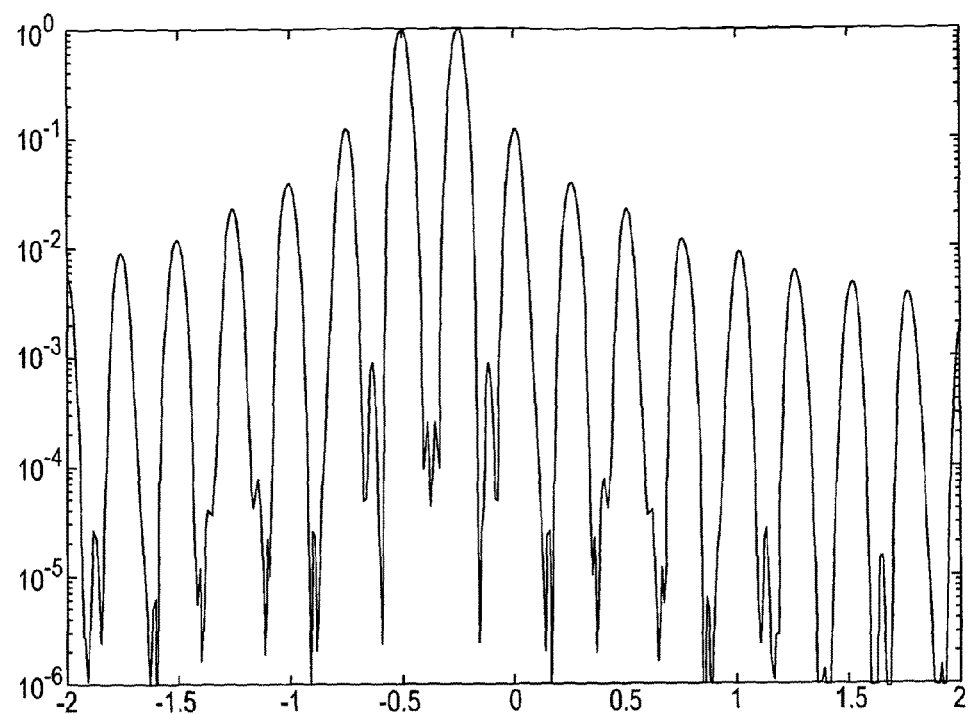
FIGS. 18a and 18b illustrate multicasting using a grating, illustrating, respectively, intensity at the Fourier plane (note the two peaks and crosstalk to either side of these), and the corresponding kinoform phase pattern (two superimposed patterns)
Figure 18B:
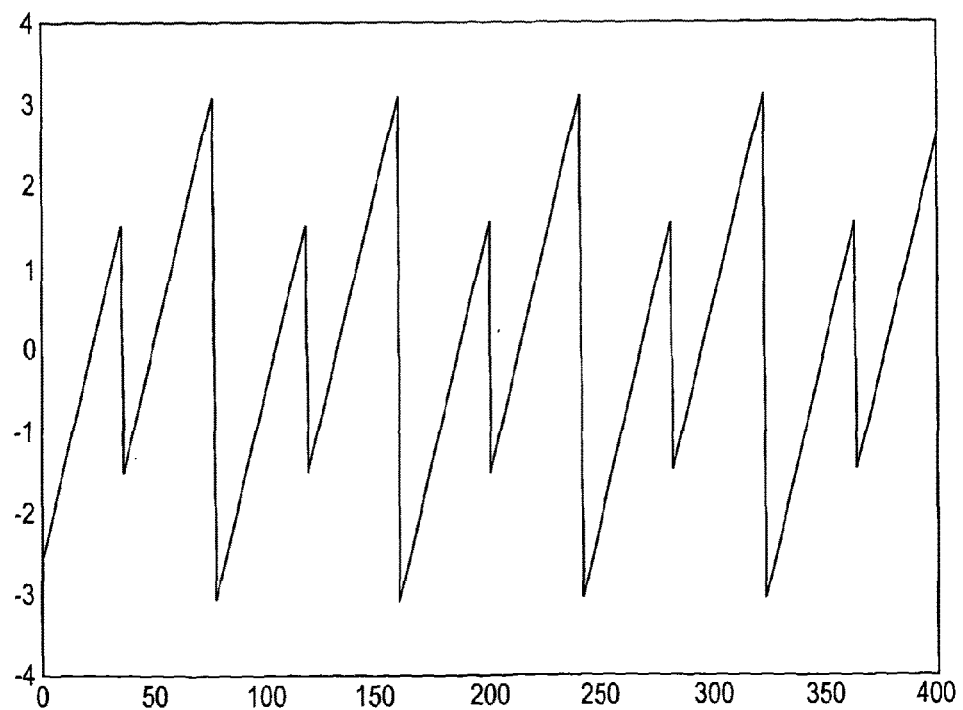

FIG. 18 illustrates multi-casting applied to the system of FIG. 1a, with the kinoform optimized using the Case 1 algorithm and assuming a continuous phase range between 0 and $2\pi$. FIG. 18(a) shows the replay field at the Fourier plane when we multi-cast to two discrete locations (−0.25 mm and −0.5 mm from the optical axis). FIG. 18b shows the corresponding phase profile of the kinoform. From FIG. 18a we can see that the light is deflected primarily to the desired locations, but significant power appears at the higher order positions. To reduce this power we can apply further optimization techniques as described in our co-pending UK patent application number GB1102715.8.

Figure 19A:
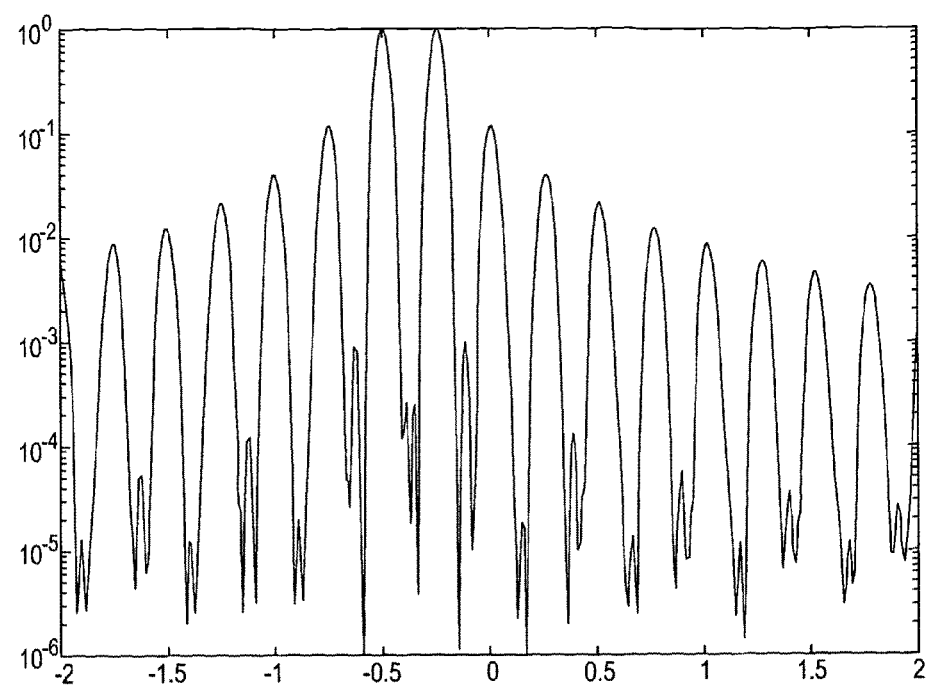
FIGS. 19a and 19b illustrate multicasting with wavefront encoding using a 'ping-pong algorithm', illustrating, respectively, an intensity distribution at a replay plane, calculated using FrFFT[$E_H$(x),a], illustrating a pattern similar to FIG. 16a, and a corresponding kinoform phase pattern (illustrating a combination of two different ramp gradients corresponding to the two peaks, and curvature corresponding to encoded lens power)
Figure 19B:
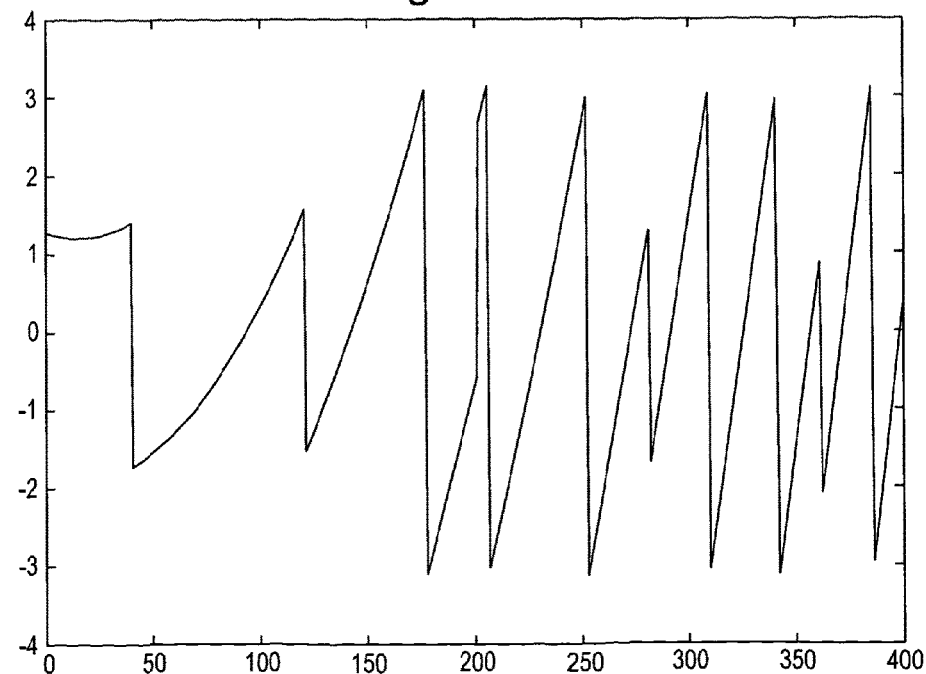

FIG. 19 illustrates the analogous performance when we implement multi-casting with a wavefront encoded pattern using the algorithm of Case 2 algorithm and assuming a continuous phase range between 0 and $2\pi$. The system parameters were those given previously (f=200 mm, s=40 mm, and so forth). FIG. 19a shows the replay field at the output plane, and FIG. 19b the phase pattern of the kinoform. As can be seen, the performance is almost identical (FIGS. 18a and 19a). Thus one might take the view that wavefront encoding does not give an advantage in this situation as crosstalk still occurs at the same points. Essentially the wavefront encoded kinoform is replicating the underlying multi-casting pattern at a number of planes in the replay volume (the ±1, ±2, ±3, ...) focal planes. However in the case of a non-ideal SLM the techniques we describe can nonetheless mitigate general diffracted light "noise" from the various non-ideal aspects of the SLM, as previously mentioned.

Multicasting Using a Lock-and Key Approach

In order to address the above mentioned issue, we can consider interconnecting not to a plane, but to a 3D volume. As fibre ribbons are flat and the fibres are closely packed one approach is to use a flat fibre ribbon and a lenslet array with each lenslet facet having a different focal length, as shown in FIG. 20, to implement a "lock and key" approach.

Figure 20A:
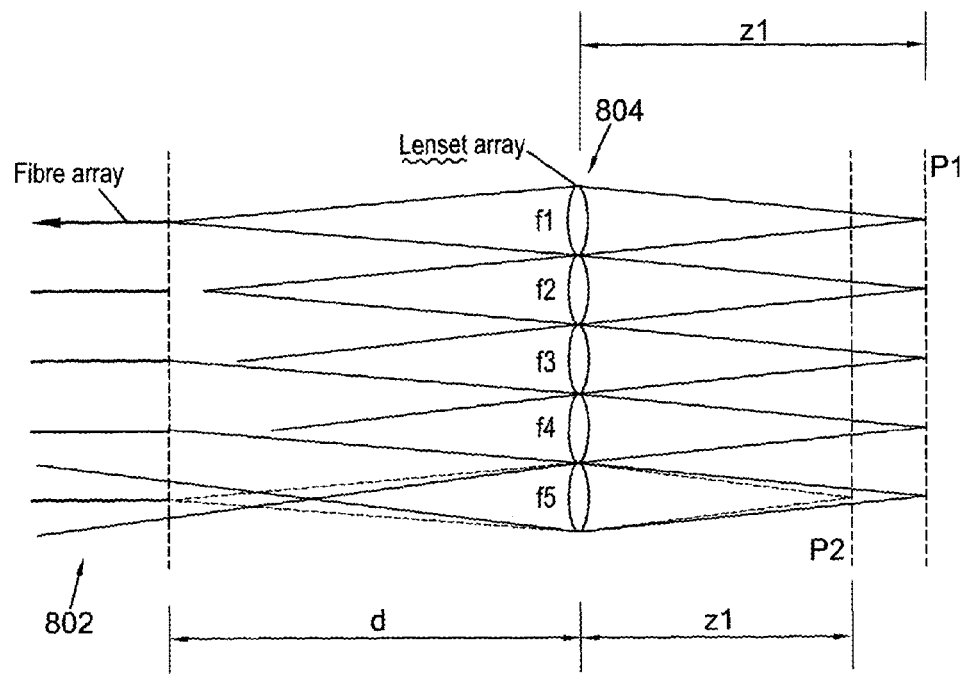
FIGS. 20a and 20b illustrate a modification to the optical beam routing apparatus of FIG. 1c to implement multicasting according to an embodiment of the invention, deflecting the signal beams into a volume rather than a plane, breaking the symmetry of the fibre array using an intermediate lenslet array where each lens facet has a different focal length to reduce crosstalk when multicasting.
Figure 20B:
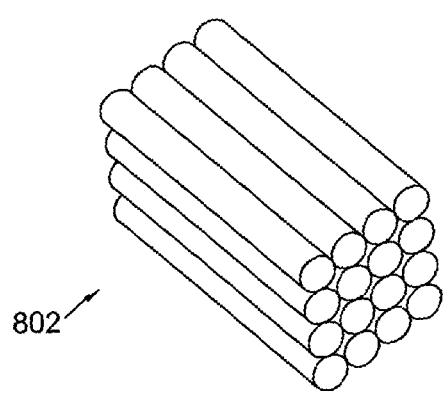

Referring to FIG. 20, this shows a modification of an output portion of the apparatus of FIG. 1c to provide a multicasting output stage 800 according to an embodiment of the invention. The output stage comprises a fibre array 802 preceded in the optical output path by a lenslet array 804, each lens of the array having a different focal length. Thus by choosing the intermediate plane (P1, P2) at which the +1 diffraction order is focussed prior to the lenslet array, by selecting the (off-axis) lens power encoded on the kinoform, efficient coupling to just the selected output is provided.

Consider a single fiber and lenslet 1 of focal length $f_1$. In an example system the beam from the SLM is focused a distance $z_1$ from the lenslet and has a beam waist of $w_1$. The distance from the fibre to the lenslet is d, and the desired beam waist at the output fibre is $w_f$. The relationship between $z_1$, $f_1$, and $w_1$ and the position of the output waist ($z_2$) and waist size ($w_2$) is a well known function. In the absence of beam clipping (aperture of lenslet<diameter of beam):

$$z_2 = f_1 - \frac{f_1^2(f_1 - z_1)}{(f_1 - z_1)^2 + Q_1^2} \tag{24a}$$

$$Q_1 = \frac{\pi w^2}{\lambda} \tag{24b}$$

$$w_2 = \left[\frac{1}{f_1^2}\left(\frac{\pi w_1}{\lambda}\right)^2 + \left(1 - \frac{z_1}{f_1}\right)^2 \frac{1}{w_1^2}\right]^{-1/2} \tag{24b}$$

For maximum coupling efficiency, $z_2$=d, and $w_2$=$w_f$. The actual percentage of power coupled can be calculated using the mode overlap integral for the fibre.

If we have N output fibres and N output lenslet facets, each with a distinct focal length of $f_n$, then to couple efficiently into $n^{th}$ fibre we should have the incident beam positioned at the desired value of $z_1(n)$. This is best explained by referring to FIG. 20. Here we have five incident beams, all focused at an intermediate plane P1 before the lenset array. As each lenslet facet has a different focal length, $f_n$, the beams are focused at different positions with respect to the fibre array (solid rays). As a result, only one beam is coupled efficiently (the top channel). However, if the SLM displays a phase pattern that focuses the light at a different intermediate plane P2 (dashed rays), the bottom channel couples with high efficiency Thus multi-casting to two fibers, n and n', employs two defocus values, $z_1(n)$, and $z_1(n')$ to match the lenslet focal lengths of $f_n$, and $f_n'$. To connect to fibers n and n' we employ two lens functions of different focal lengths. The underlying idea is that higher orders will not couple efficiently as they are defocused. Thus interconnecting to a 3D volume and using an asymmetric lenslet array should reduce crosstalk when multi-casting (disregarding clipping losses). One can also consider other options, for example an additional diffractive axicon array (an axicon is an element that has a phase profile equivalent to a cone) positioned after the lenslet array that converts the incident Gaussian beam to a circle focus that substantially completely misses the fibre.

Figure 21A:
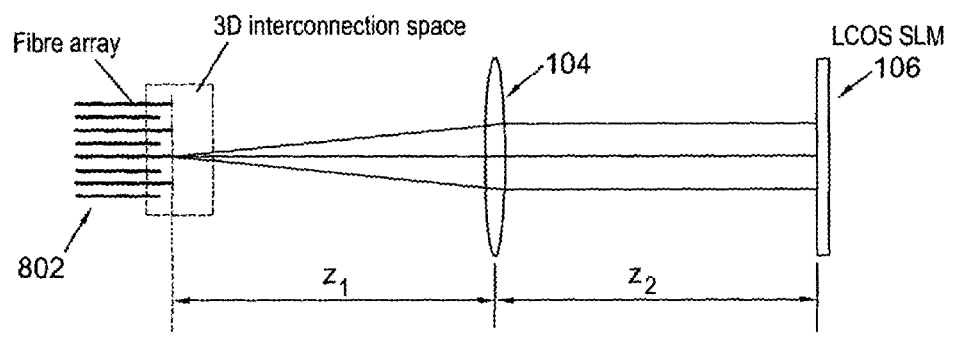
FIGS. 21a and 21b illustrate a modification to the optical beam routing apparatus of FIG. 1c to implement multicasting according to an embodiment of the invention, deflecting the signal beams into a volume.
Figure 21B:
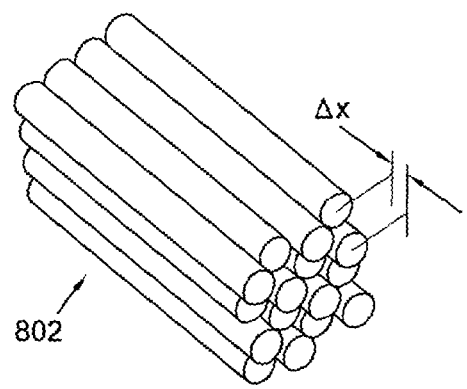

FIG. 21 illustrates an alternative embodiment 900 of the apparatus, in which the positions of the fibres of the array 802 are staggered relative to one another by an amount $\Delta x_{ij}$ to, for example, define two (or multiple) planes. Staggering the fibres of the fibre array breaks the symmetry of the optical system and reduces crosstalk when multicasting. An optimized kinoform is used to focus the +1 (or −1) diffraction order to the desired target fibre(s). Due to the longitudinal staggering of the fibres, crosstalk to the other output positions can be minimized; more particularly the fibre positioning need not be regular and may be optimized to minimize crosstalk. This approach is also useful for applications that provide multi-casting (routing to more than one output fibre). In addition, an intermediate optical element, such as a lenslet array or spatial filter may optionally be used to enhance crosstalk suppression.

Generalized Wavefront Encoding

FIG. 22 illustrates how the purposeful application of defocus can be applied using the kinoform design methods described previously in this patent to a beam-steering switch to mitigate crosstalk. This approach is also applicable to switches based on anamorphic optics, such as cylindrical lenses or lenslet arrays. Moreover, we may use an arbitrary wavefront distortion instead of the defocus to implement wavefront encoding illustrated in FIG. 20. So far we have used the lowest order aberration, namely defocus, as our built-in system aberration. Higher order aberrations or combinations of aberrations, which may, for example, be represented by a summation of Zernike polynomials can also be used. For example, we can use a generalized error in conjunction with a custom designed lenslet array in such a way that the light is not simply spread out, but redirected away from the fibre core. This we way may define as a generalized wavefront encoding technique.

Figure 22A:
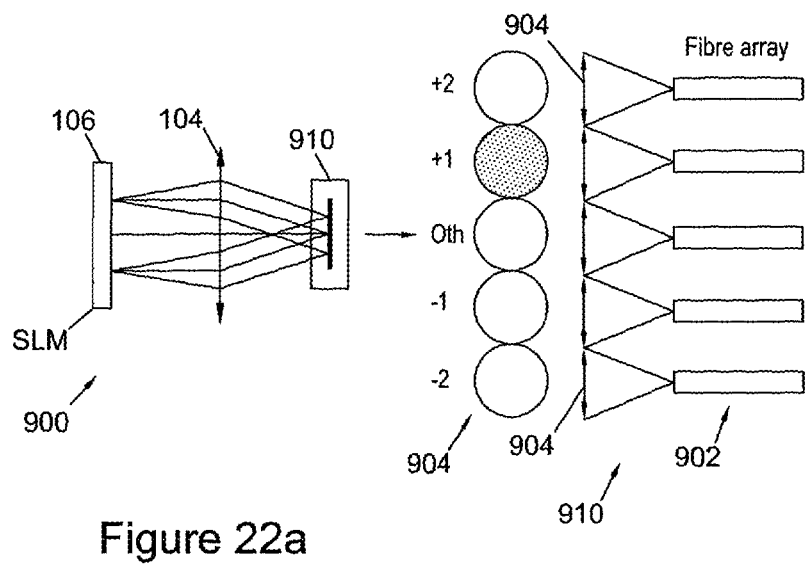
FIGS. 22a and 22b illustrate 'lock and key' or matched filtered wavefront encoding showing, respectively, a symmetric system where a plane wavefront is focused in front of a lenslet array, coupling the light into a fibre array; and an embodiment of a system which purposefully aberrates the wavefront so the +1 order couples into its corresponding fibre as only this lenslet corrects for the aberration (the other orders being defocused) thus illustrating an embodiment of multicasting optical beam routing apparatus according to the invention.
Figure 22B:
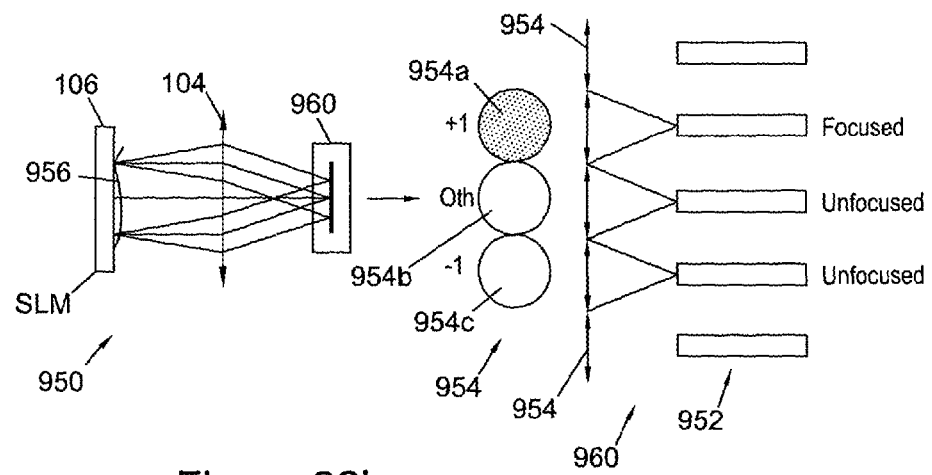

To illustrate this, refer to the switch 900 shown in FIG. 22a. In FIGS. 22a and 22b like elements to those previously described are indicated by like reference numerals. The system of FIG. 22a has an output stage 910 comprising an input/output fibre array 902 and a matching lenslet array 904, with each lenslet having substantially identical parameters, and an SLM 106. In this symmetric system, a lenslet is designed to convert the divergence of the light emitted by the fibres to a value that matches the optical system.

The system 950 of FIG. 22b may incorporate an output stage 800 similar to that described with reference to FIG. 20, but more generally, the lenslet array 804 may be replaced with a matched filter. Thus the switch 950 shown in FIG. 22b has an output stage 960 comprising an input/output fibre array 952 and a lenslet array 954. However in FIG. 22b we replace the symmetric lenslet array with a lenslet array 954 that has a pre-calculated wavefront error added to the focusing function. This wavefront error may be implemented using a phase mask 956 and the error may vary between facets. This may be compensated for by a matched phase mask (conceptually illustrated by line 956) displayed on the kinoform. Thus, in order that the diffracted light from the SLM is efficiently coupled into a specific fibre, the SLM should aberrate the incident beam in such a way as to cancel out the inbuilt aberration of the lenslet in a "lock and key" approach. In FIG. 22b the aberrated +1 order, unchanged zeroth order and complex conjugate of the +1 order are indicated by reference numerals 954a,b,c respectively. In embodiments each lenslet is encoded to focus just the routed (+1) diffraction order.

Other possible wavefront encoding scenarios can also be envisioned, including geometries where either a static or reconfigurable phase distorting mask placed immediately before or after the Fourier transform lens is used to distort the wavefront. The beam steering hologram in such cases should therefore also add a compensating phase profile to the grating or off-axis lens pattern to ensure the final signal beam is Gaussian. Due to symmetry conditions, the other hologram orders will be further aberrated.

SUMMARY

Broadly speaking we have described a method of improving performance of WDM switches based on LCOS SLMs by purposefully introducing a wavefront error, such as defocus, into the optical system design. To compensate for this designed aberration we display an optimized kinoform that compensates for the built in error and thereby efficiently focuses the +1 order into the desired output fibre. Higher diffraction orders, on the other hand, are aberrated and fail to couple efficiently into the fibres. This compensation takes the form of a kinoform calculated using a modulo $2\pi$ algorithm. By purposefully introducing an aberration into the optical system, such as, but not limited to, defocus, we can significantly reduce the crosstalk power as illustrated in FIG. 3, earlier. We call this technique wavefront encoding—we specifically design an aberration or wavefront error into the optical system in order to improve overall performance. To compensate for this error the kinoform is adapted to cancel out the wavefront error. In doing so the higher diffraction orders become more aberrated and couple less efficiently into the output fibres, thereby reducing crosstalk. Wavefront encoding is suitable for a kinoform phase pattern as it is non-periodic.

Further, by purposefully introducing defocus into the optical system we can filter out any remaining zeroth order power by placing a blocking aperture at the zeroth order focal plane, also as illustrated in FIG. 3, earlier. Again this is suitable for a kinoform phase pattern as it is non-periodic.

We have also described use of interconnecting into a 3D volume instead of onto a 2D plane, where each beam in the switch is focused at a specific point in space as opposed to a specific point on a plane. By using a lenslet array positioned before the fibre array, where each lenslet has a different focal length, we can ensure that only light focused at a specific position in a volume of space is efficiently coupled into a specific fibre. This facilitates multi-casting. Embodiments of this technique can also be implemented by adding aberrating diffractive patterns to the fundamental focusing function of the lenslet array.

Still further, in embodiments there is a reduction of crosstalk due to dynamic effects: By purposefully introducing an aberration into the optical system, such as, but not limited to, defocus, we can significantly reduce the crosstalk power that occurs as holographic patterns are switched between different interconnection patterns.

In embodiments the techniques we have described are particularly to the routing of optical signal beams, in particular in the telecommunications c-band (the 1.5 micron wavelength window), to produce telecommunications devices operating in the near infra-red.

No doubt many effective alternatives will occur to the skilled person. It will be understood that the invention is not limited to the described embodiments and encompasses modifications apparent to those skilled in the art lying within the scope of the claims appended hereto.

What is claimed is:

1. Optical beam routing apparatus comprising:
   at least one optical input to receive an input beam;
   a plurality of optical outputs;
   a spatial light modulator (SLM) on an optical path between said optical input and said optical outputs; and
   a driver for said SLM to display a kinoform on said SLM to diffract said input beam into an output beam comprising a plurality of diffraction orders, wherein a routed one of said diffraction orders is directed to at least one selected said optical output;

wherein said apparatus comprises a lens or mirror arranged between said SLM and said optical outputs in said optical path, wherein said lens or mirror is configured to modify a wavefront of said output beam by displacing said optical outputs away from a focal plane defined by said lens or mirror to reduce a coupling of said output beam into said selected optical output; and wherein said kinoform is adapted to compensate for said displacement by said lens or mirror to compensate for said reduced coupling and thereby to reduce a coupling of other diffracted light from said input beam into others of said optical outputs than said at least one selected optical output.

2. Apparatus as claimed in claim 1 wherein said lens or mirror is configured to modify at least part of said wavefront by a phase of at least $\pi/2$, $\pi$ or $2\pi$ via said displacing.

3. Apparatus as claimed in claim 1 wherein said other diffracted light comprises others of said diffraction orders than said routed diffraction order.

4. Apparatus as claimed in claim 3 wherein a full width at half maximum (FWHM) spot size of one of said others of said diffraction orders at a said optical output other than said selected optical output is at least twice a FWHM spot size of said routed diffraction order at said selected optical output.

5. Apparatus as claimed in claim 1 wherein said lens or mirror is configured to defocus said routed one of said diffraction orders on said selected optical output, and wherein said kinoform includes lens power to compensate for said defocus.

6. Apparatus as claimed in claim 5 wherein said lens power in said kinoform compensates for said displacement away from said focal plane.

7. Apparatus as claimed in claim 6 further comprising a spatial filter located at said displaced focal plane to attenuate undiffracted light from said SLM.

8. Apparatus as claimed in claim 1, wherein said kinoform is configured to direct light from said input beam to a plurality of said optical outputs, the apparatus further comprising at least one optical element in said optical path between said SLM and said optical outputs configured such that a different said wavefront modification is applied to light directed to each said optical output, and wherein said kinoform is adapted to apply a corresponding said wavefront modification compensation to each selected said optical output.

9. Apparatus as claimed in claim 8 wherein said optical element comprises an array of lenslets of different focal lengths.

10. Apparatus as claimed in claim 1 wherein said driver for said SLM comprises a beam selection data input, a driver output coupled to said SLM, and one or both of non-volatile memory and a data processor coupled between said beam selection data input and said driver output to provide kinoform data for displaying a said kinoform on said SLM, to select one or more said optical outputs responsive to input beam selection data.

11. Apparatus as recited in claim 1 configured as a wavelength division multiplexed (WDM) optical switch, wherein said at least one optical input and said plurality of optical outputs comprise optical fibres, and wherein said SLM is an LCOS (liquid crystal on silicon) SLM.

12. Apparatus as recited in claim 1 configured as a wavelength division multiplexed (WDM) optical switch, wherein said SLM displays a plurality of said kinoforms, one for each wavelength, and wherein different spatial regions on said SLM display different said kinoforms.

13. A method of routing an optical beam, the method comprising:
receiving at least one input optical beam at a spatial light modulator (SLM); and diffracting said input optical beam by displaying a kinoform on said SLM to direct a routed diffraction order of said diffracted beam to at least one selected optical output of a plurality of optical outputs;

wherein the method further comprises:
modifying a wavefront of said routed diffracted beam to reduce a coupling of said diffracted beam into said selected optical output; and
compensating for said wavefront modifying of said routed diffracted beam using said kinoform, to compensate for said reduced coupling such that a coupling of said diffracted light into others of said optical outputs than said at least one selected optical output is reduced.

14. A method as claimed in claim 13 wherein said modifying comprises defocusing a said optical output and wherein said kinoform is used to encode lens power to compensate for said defocusing.

* * * * *